US007657182B2

(12) United States Patent
Hase et al.

(10) Patent No.: US 7,657,182 B2
(45) Date of Patent: Feb. 2, 2010

(54) LIQUID LENS OPTICAL TRANSMITTER SYSTEM

(75) Inventors: Kazutoshi Hase, Osaka (JP); Hideo Yasumoto, Osaka (JP); Keisuke Kinoshita, Osaka (JP); Tomoaki Ieda, Osaka (JP); Hiroyuki Sasai, Osaka (JP)

(73) Assignee: Panasonic Corporation, Osaka (JP)

( * ) Notice: Subject to any disclaimer, the term of this patent is extended or adjusted under 35 U.S.C. 154(b) by 503 days.

(21) Appl. No.: 11/498,149

(22) Filed: Aug. 3, 2006

(65) Prior Publication Data

US 2007/0206952 A1 Sep. 6, 2007

(30) Foreign Application Priority Data

Aug. 4, 2005 (JP) .............................. 2005-226430

(51) Int. Cl.
*H04B 10/00* (2006.01)
*G02B 3/14* (2006.01)

(52) U.S. Cl. ..................... 398/120; 398/129; 398/131; 398/170; 359/599

(58) Field of Classification Search ......... 398/118–120, 398/128–131, 168–170, 201; 359/599
See application file for complete search history.

(56) References Cited

U.S. PATENT DOCUMENTS

| 3,531,185 | A | * | 9/1970 | Buchsbaum et al. ........ 359/665 |
| 5,347,387 | A | * | 9/1994 | Rice ........................... 398/129 |
| 5,822,099 | A | | 10/1998 | Takamatsu |
| 6,369,954 | B1 | | 4/2002 | Berge et al. |
| 6,448,572 | B1 | * | 9/2002 | Tennant et al. ......... 250/559.38 |
| 6,657,783 | B1 | * | 12/2003 | Presby et al. ................ 359/399 |
| 2001/0017985 | A1 | | 8/2001 | Tsuboi et al. |
| 2003/0228152 | A1 | * | 12/2003 | Takahashi et al. ........... 398/131 |
| 2006/0045501 | A1 | * | 3/2006 | Liang et al. .................... 396/62 |

FOREIGN PATENT DOCUMENTS

| JP | 53-038201 | 4/1978 |
| JP | 06-083145 | 10/1994 |
| JP | 08-046572 | 2/1996 |
| JP | 08-163038 | 6/1996 |
| JP | 09-069817 | 3/1997 |
| JP | 10-063991 | 3/1998 |
| JP | 11-095880 | 4/1999 |
| JP | 11-150512 | 6/1999 |
| JP | 2000-156664 | 6/2000 |
| JP | 2000-347005 | 12/2000 |

(Continued)

*Primary Examiner*—Nathan M Curs
(74) *Attorney, Agent, or Firm*—Wenderoth, Lind & Ponack, L.L.P.

(57) ABSTRACT

An optical transmission apparatus is provided in which high optical output power is secured in an optical transmitter, the fine adjustment of the optical axis is unnecessary, and the propagation range of the optical output signal can be adaptively changed. A diffusing liquid lens includes a first liquid and a second liquid containing a scattering material that scatters light, and the curvature of the boundary surface between the first and the second liquids is changed according to the control voltage applied from a controlling unit. A first optical signal outputted from a light emitting device is diffused in the first liquid, and emitted as a second optical signal having a spread angle corresponding to the curvature of the boundary surface and a substantially uniform radiant intensity distribution.

10 Claims, 19 Drawing Sheets

FOREIGN PATENT DOCUMENTS

| | | |
|---|---|---|
| JP | 2001-249282 | 9/2001 |
| JP | 2001-292105 | 10/2001 |
| JP | 2004-061143 | 2/2004 |
| JP | 2006-500710 | 1/2005 |
| JP | 2006-072295 | 3/2006 |
| WO | 2004/027769 | 4/2004 |

* cited by examiner

BEFORE VOLTAGE APPLICATION

AFTER VOLTAGE APPLICATION

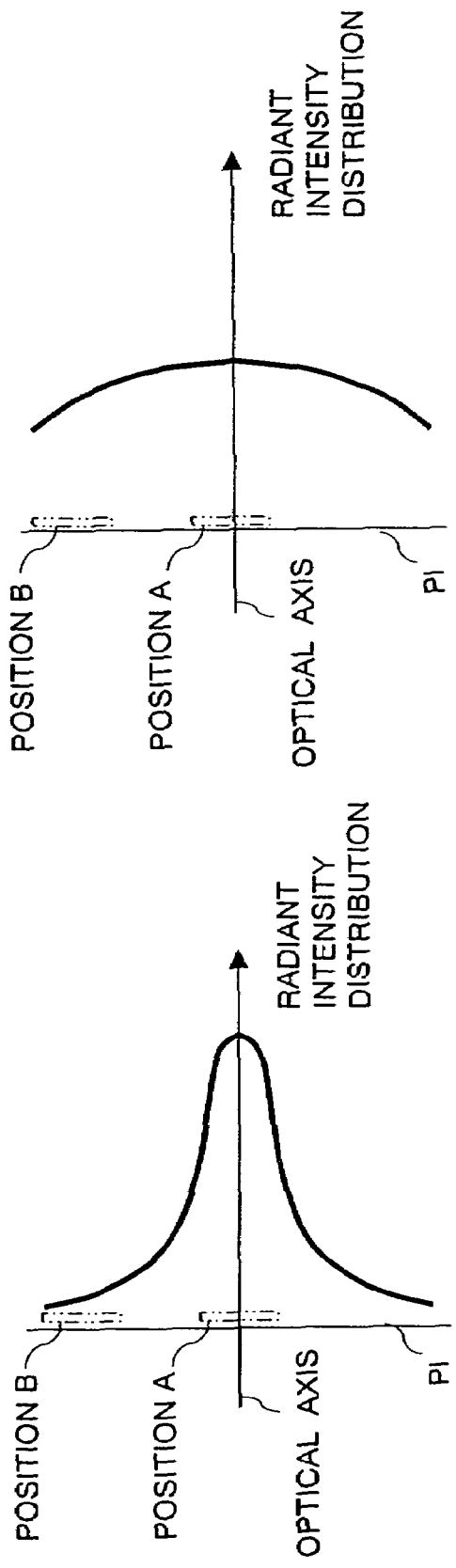

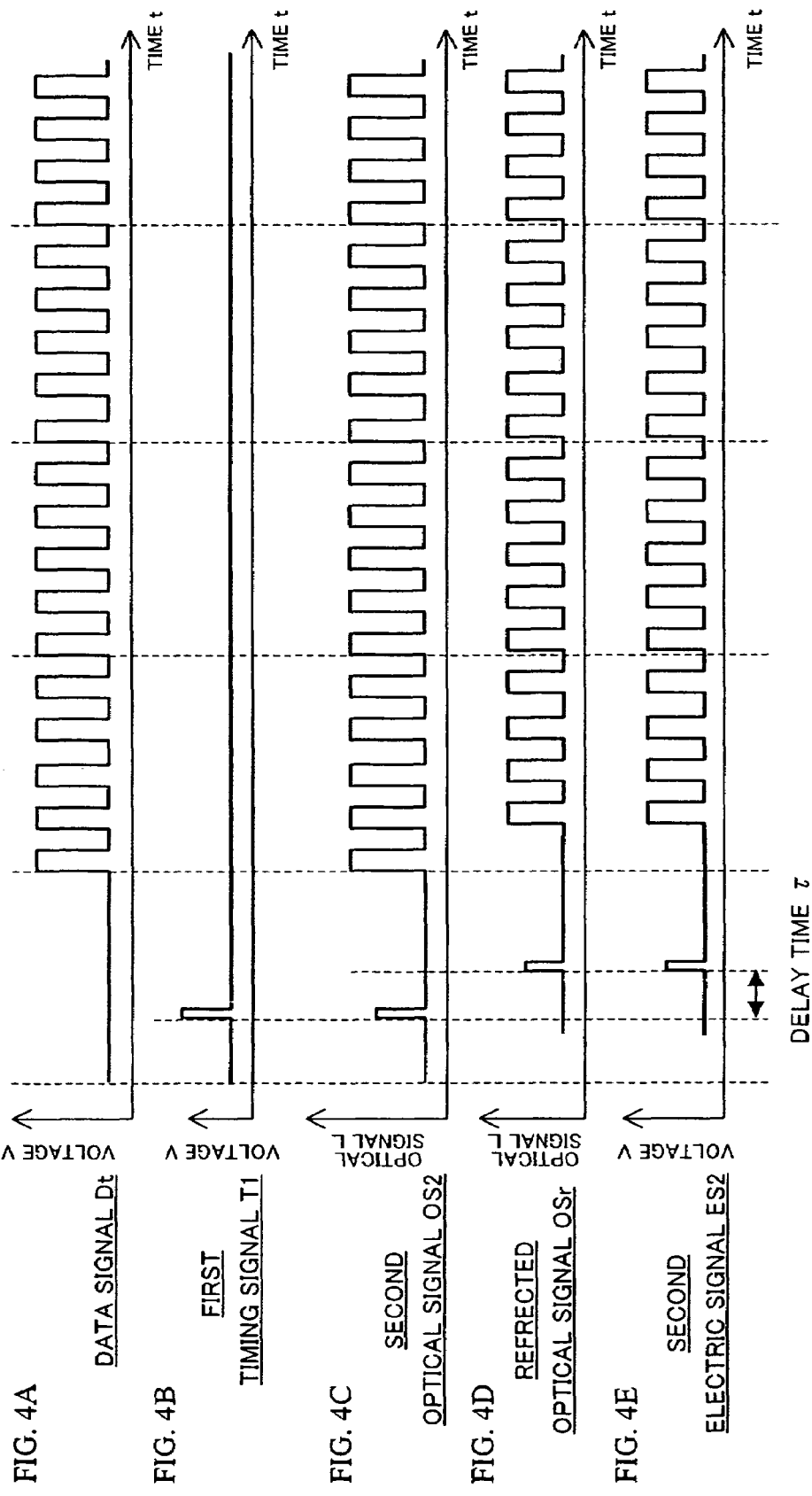

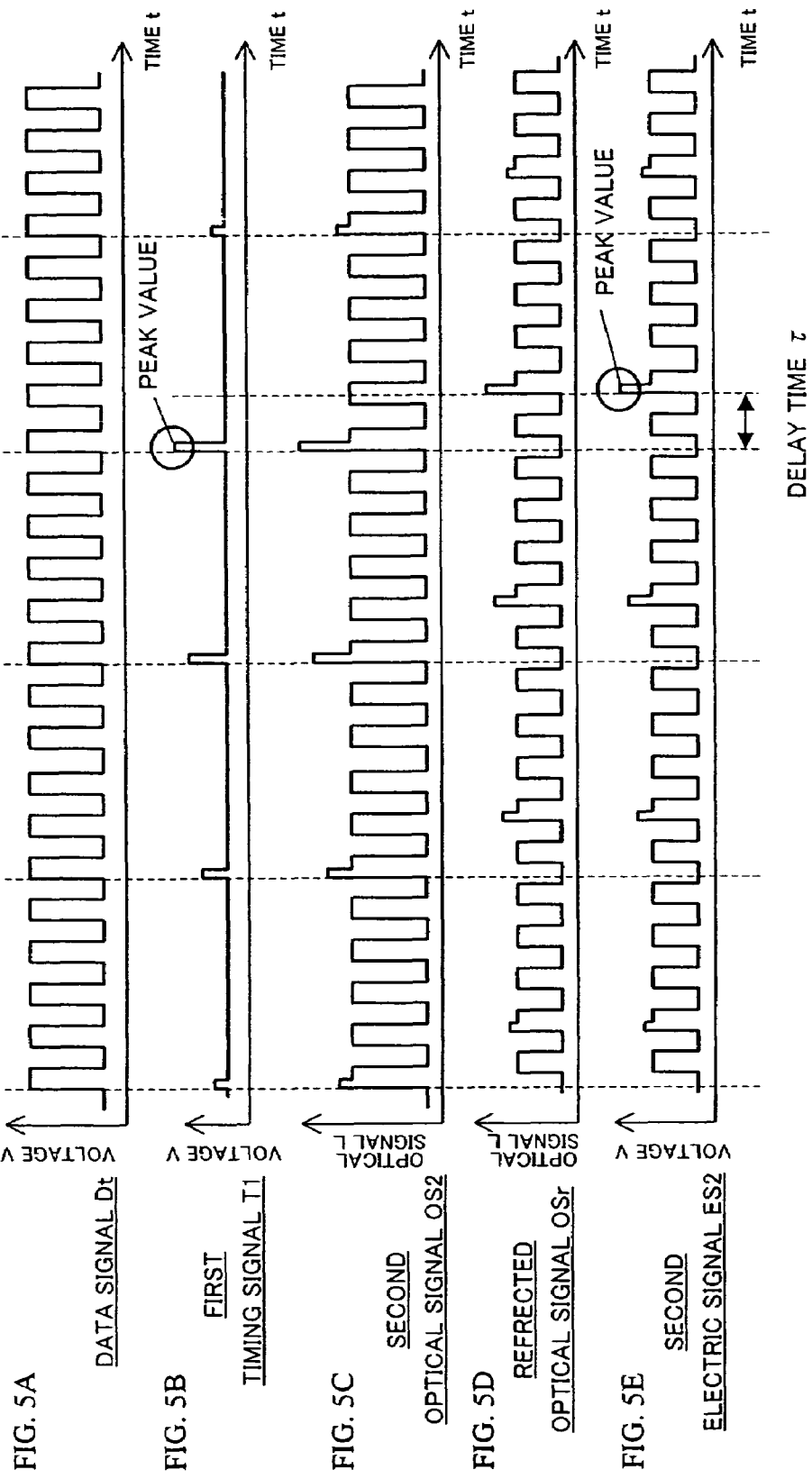

| DELAY TIME τ | CONTROL VOLTAGE V | RADIUS OF CURVATURE r |
|---|---|---|
| τ1 (LARGE) | V1 (SMALL) | r1 (LARGE) |
| τ2 (MIDDLE) | V2 (MIDDLE) | r2 (MIDDLE) |
| τ3 (SMALL) | V3 (LARGE) | r3 (SMALL) |

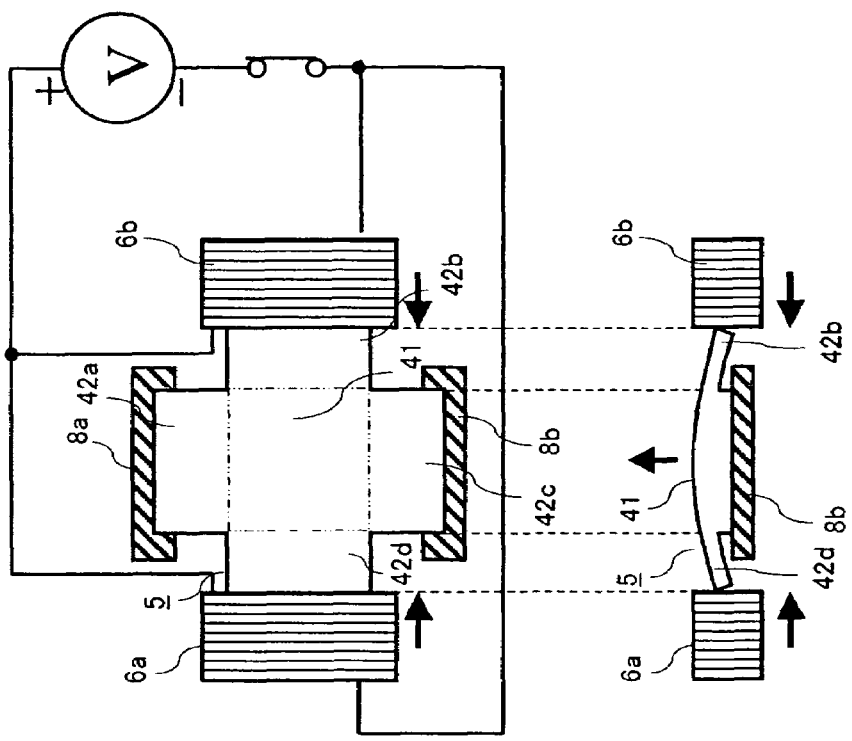
FIG. 15A BEFORE VOLTAGE APPLICATION
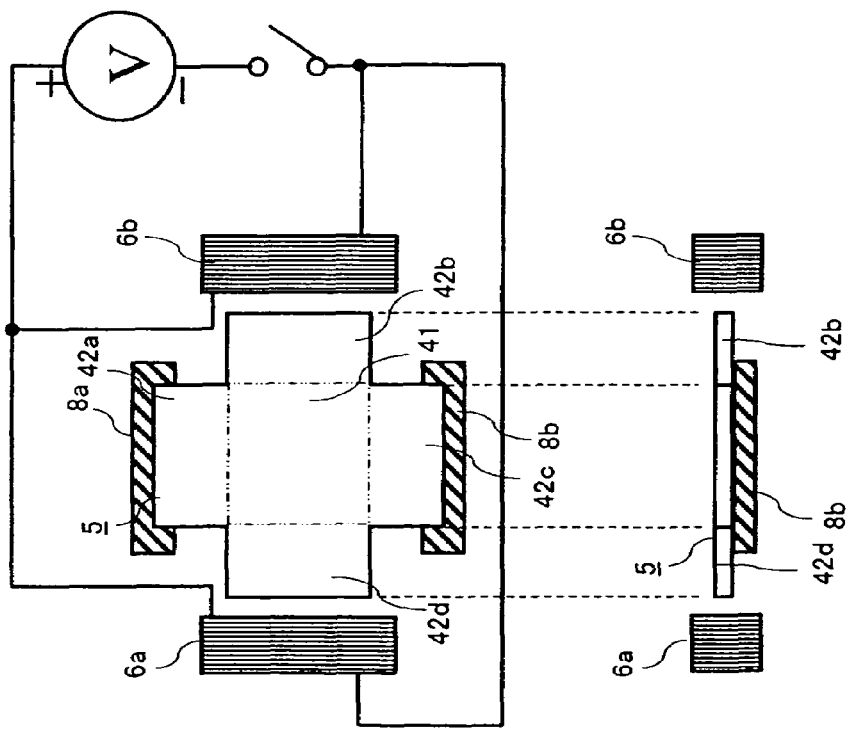
FIG. 15B AFTER VOLTAGE APPLICATION

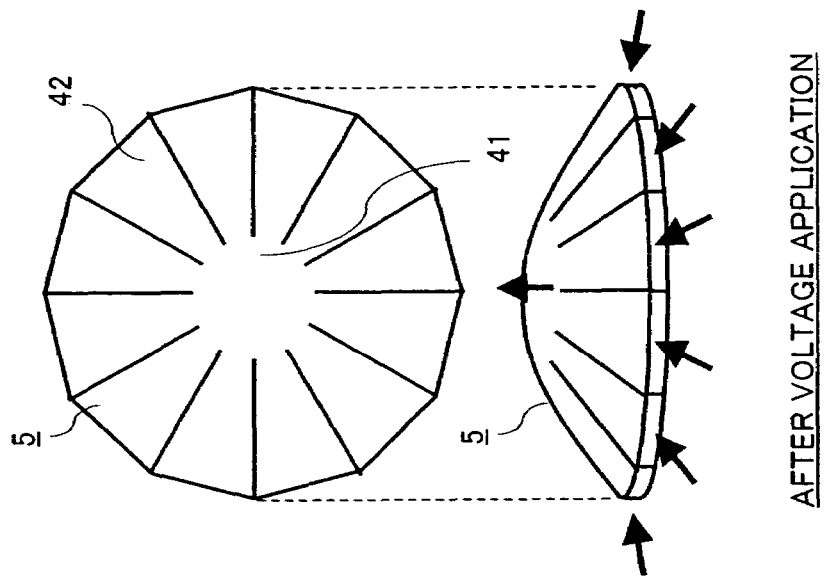
FIG. 18B AFTER VOLTAGE APPLICATION
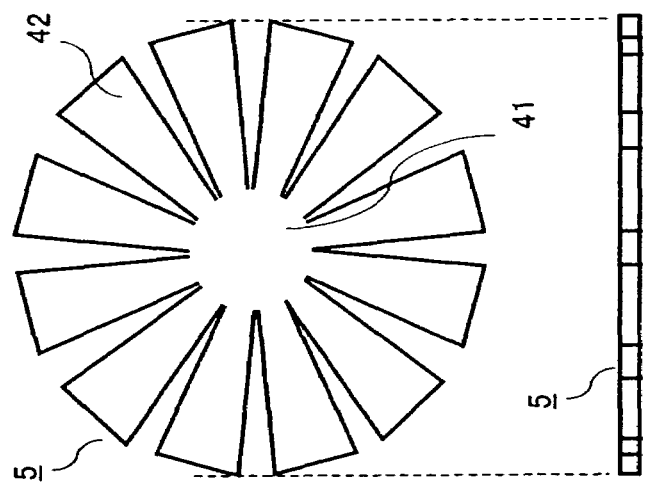
FIG. 18A BEFORE VOLTAGE APPLICATION

DIFFUSING PLATE 21

DIFFUSING PLATE 22

DIFFUSING PLATE 23

DIFFUSING PLATE 24

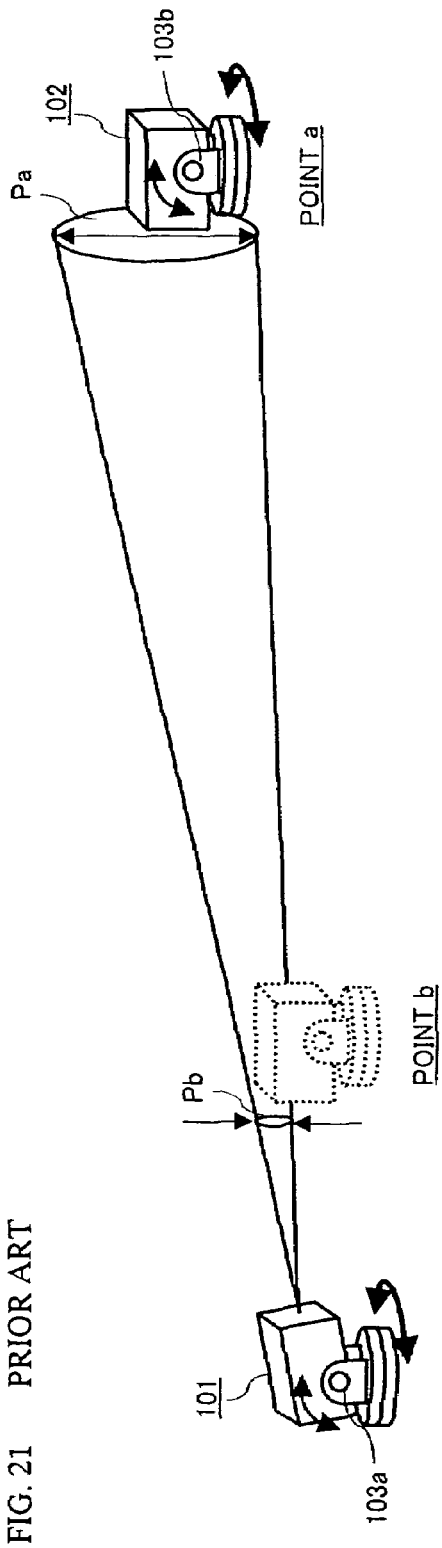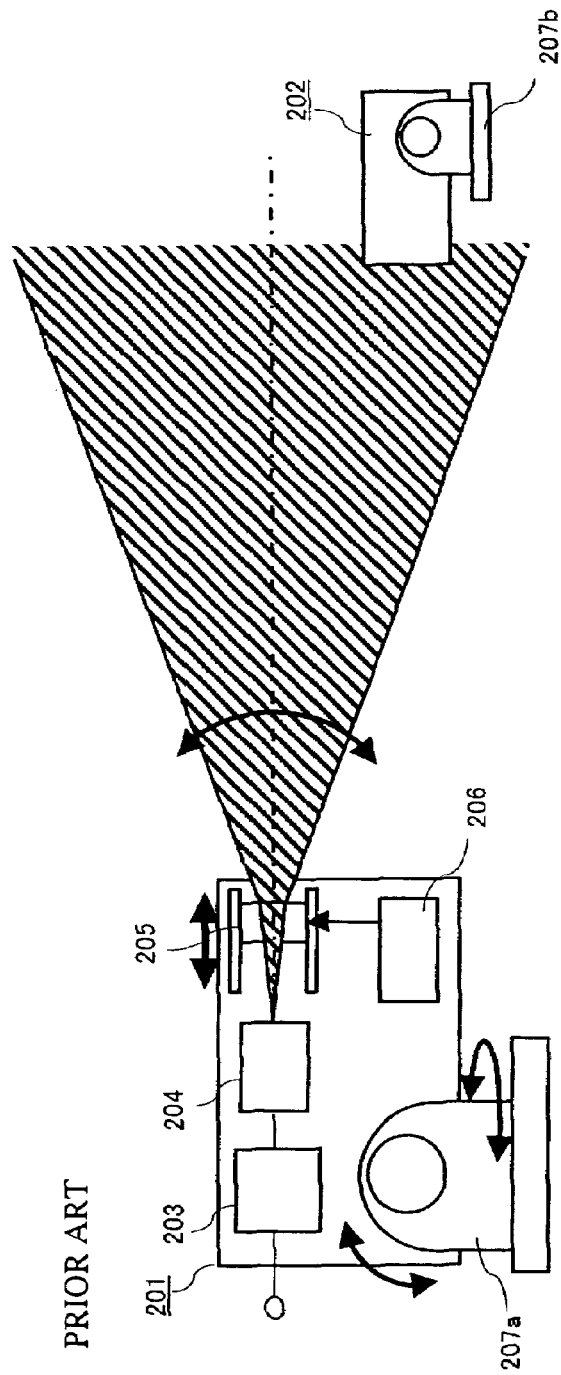
FIG. 21 PRIOR ART
FIG. 22 PRIOR ART

LIQUID LENS OPTICAL TRANSMITTER SYSTEM

BACKGROUND OF THE INVENTION

1. Field of the Invention

The present invention relates to an optical transmitter, and more particularly, to an optical transmitter that transmits an optical signal to an optical receiver through free space.

2. Description of the Background Art

Conventionally, an optical space communication that transmits an optical signal through free space has been known. Since light which serves as the transmission medium in the optical space communication has directivity, it is necessary to adjust the optical axis between the optical transmitter and the optical receiver.

FIG. 21 is a view of an example of an optical space transmission apparatus having an optical axis adjusting function.

An optical transmitter 101 and an optical receiver 102 respectively have optical axis adjusting mechanisms 103a and 103b that are rotatable about a horizontal axis and a vertical axis. To enable the optical communication between the optical transmitter 101 and the optical receiver 102, the optical axis adjusting mechanisms 103a and 103b are adjusted so that the optical axes of the optical transmitter 101 and the optical receiver 102 substantially coincide with each other.

For example, when the optical receiver 102 is disposed at a point a, it is necessary for the optical axes of the optical transmitter 101 and the optical receiver 102 only to be adjusted so that the light receiving surface of the optical receiver 102 is included in a propagation plane Pa of the light emitted from the optical transmitter 101. On the other hand, when the optical receiver 102 is disposed at a point b, it is necessary to adjust the optical axes so that the light receiving surface of the optical receiver 102 is included in a propagation plane Pb smaller than the propagation plane Pa at the point a.

Thus, in the optical space transmission apparatus shown in FIG. 21, although the optical axis adjustment is easy when the distance between the optical transmitter 101 and the optical receiver 102 is comparatively long, the shorter the distance is, the more difficult the optical axis adjustment is.

Accordingly, to solve this problem, an optical space transmission apparatus as described below is known (see, for example, Japanese Examined Patent Publication No. 06-83145 (FIG. 1)).

FIG. 22 is a view of the schematic structure of a conventional optical transmission apparatus.

With reference to FIG. 22, an optical transmitter 201 and an optical receiver 202 are disposed so as to be opposed to each other. The optical transmitter 201 has: a transmission circuit unit 203; a light emitting device 204 that converts an electrical signal into an optical signal; a zoom lens 205; a drive controlling unit 206 that outputs a control signal for adjusting the zoom ratio of the zoom lens 205; and an optical axis adjusting mechanism 207a that adjusts the optical axes. The optical receiver 202 has an optical axis adjusting mechanism 207b.

The optical axes of the optical transmitter 201 and the optical receiver 202 are adjusted by using the optical axis adjusting mechanisms 207a and 207b like the example of FIG. 21. In addition, some of the lens elements constituting the zoom lens 205 move backward and forward along the optical axis according to the control signal outputted from the drive controlling unit 206. Since the movement of the lens elements changes the spread angle of the optical signal, the area of the propagation plane of the optical signal emitted from the optical transmitter 201 changes with respect to the light receiving surface of the optical receiver 202.

Therefore, even when the distance between the optical transmitter 201 and the optical receiver 202 is comparatively short, the adjustment of the optical axes of the optical transmitter 201 and the optical receiver 202 can be facilitated by adjusting the zoom ratio of the zoom lens 205 so that the spread angle of the emitted light is increased.

However, in the optical space transmission apparatus, from the viewpoint of user safety, the optical output power is restricted. Therefore, in actuality, optical communication cannot be performed with the spread angle being increased by the zoom lens 205.

Specifically, when the optical signal outputted from the light emitting device 204 is emitted through the zoom lens 205, the light source viewed from the exit plane of the zoom lens 205 is assumed to be the point source. For example, when the light emitting device 204, which is operable to emit light of a wavelength $\lambda$ of 850 nm, outputs an optical signal through the zoom lens 205, the maximum optical output power satisfied the eye safety is determined to be 0.78 mW according to the IEC60825-1 standard.

The determined optical output power is not sufficient for performing optical communication. Therefore, to efficiently use the limited optical output power, it is necessary to operate the optical axis adjusting mechanisms 207a and 207b to thereby make the optical axes of the optical transmitter 201 and the optical receiver 202 coincide with each other and then, make an adjustment to reduce the spread angle of the emitted light again by the zoom lens 205.

Further, since the substantial light receiving sensitivity of the optical receiver 202 decreases as the communication speed increases, it is desirable that the optical output power outputted from the optical transmitter be as high as possible.

SUMMARY OF THE INVENTION

Therefore, the present invention is made to solve the conventional problem, and an object thereof is to provide an optical transmitter in which the optical output power is high, the fine adjustment of the optical axes is unnecessary, and further, the propagation area of the emitted light can be adaptively adjusted.

The present invention is directed to an optical transmitter that transmits an optical signal to an optical receiver through free space. The optical transmitter is provided with: an electrical-to-optical converting unit that converts a first electrical signal to be transmitted, into an optical signal, and emits the optical signal; a diffusing liquid lens including a first liquid and a second liquid, which are separated in order in a propagation direction along an optical axis of the electrical-to-optical converting unit and a scattering material mixed in the first liquid and scattering the light and form a convex boundary surface in the propagation direction of the optical signal, a curvature of the boundary surface being changed according to a control voltage being applied; and a controlling unit that adjusts the control voltage applied to the diffusing liquid lens.

The optical transmitter may be further provided with: a transmitting unit that receives a data signal, and generates the first electrical signal based on the data signal; a reflected light receiving unit that receives a reflected optical signal which is part, of the optical signal, reflected from the optical receiver, and converts the reflected optical signal into a second electrical signal; and a delay time calculating unit that calculates a delay time of the second electrical signal from the first electrical signal, and outputs a delay signal representative of the delay time to the controlling unit. In this case, the controlling unit adjusts the control voltage based on the delay signal.

The transmitting unit may include: a timing signal generating unit that outputs a predetermined timing signal; and an adding unit that adds the data signal and the timing signal together to thereby generate the first electrical signal. In this case, the delay time calculating unit calculates the delay time based on a difference between detection times of the timing signal outputted from the timing signal generating unit and a timing signal contained in the second electrical signal.

The timing signal generating unit may output the timing signal before the adding unit receives the data signal.

Alternatively, the timing signal generating unit repetitively outputs a series of timing signals that are different in amplitude level from each other and are smaller in pulse width than the data signal.

The delay time calculating unit may detect a peak value of the timing signal outputted from the timing signal generating unit and a peak value of the timing signal contained in the second electrical signal, and calculate the delay time based on the detected peak values.

The optical transmitter may be further provided with a memory that stores control information where the control voltage is predetermined, every delay time represented by the delay signal, and the controlling unit may adjust the control voltage based on the delay signal and the control information.

The controlling unit may adjust the control voltage so that the curvature of the boundary surface is maximum in an initial state before the data signal is inputted to the transmitting unit.

A maximum value and a minimum value that are detectable may be predetermined for the delay time. In this case, when the delay time is the maximum value, the controlling unit controls the control voltage so that the curvature of the boundary surface is minimum, and when the delay time is the minimum value, the controlling unit controls the control voltage so that the curvature of the boundary surface is maximum.

A maximum value and a minimum value of a peak value of the timing signal may be predetermined. In this case, when the peak value is the maximum value, the controlling unit controls the control voltage so that the curvature of the boundary surface is maximum, and when the peak value is the minimum value, the controlling unit controls the control voltage so that the curvature of the boundary surface is minimum.

The optical transmitter may be further provided with a transmission rate changing unit that changes transmission rates of the data signal and the timing signal.

The optical receiver may transmit an intensity signal representative of an intensity of the optical signal, and the optical transmitter may be further provided with an intensity signal receiving unit that receives the intensity signal. In this case, when the intensity represented by the intensity signal received by the intensity signal receiving unit is lower than a predetermined threshold value, the controlling unit controls the voltage so that the curvature of the boundary surface of the diffusing liquid lens is decreased, and when the intensity represented by the intensity signal is higher than the threshold value, the controlling unit controls the voltage so that the curvature of the boundary surface of the diffusing liquid lens is increased.

The intensity signal may be any of a radio signal, a wire signal, an optical signal, and a reflected optical signal, which is part of the optical signal outputted from the optical transmitter and reflected by the optical receiver.

According to the present invention, the light outputted from the electrical-to-optical converting unit is diffused by the diffusing liquid lens, and an optical signal having a spread angle corresponding to the curvature of the boundary surface of the diffusing liquid lens is outputted. Since the optical signal outputted from the diffusing liquid lens can be regarded as the extended source, the output power of the electrical-to-optical converting unit can be increased.

Since the radiant intensity distribution of the light outputted from the diffusing liquid lens does not significantly change depending on the distance from the optical axis, it is unnecessary to strictly adjust the optical axes of the optical transmitter and the optical receiver, so that convenience of user improves.

Furthermore, since the curvature of the boundary surface of the diffusing liquid lens can be changed based on the control voltage, the spread angle of the optical signal can be adaptively controlled with consideration given to the distance between the optical transmitter and the optical receiver.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3A and 3B are views of the radiant intensity distributions of a zoom lens and the diffusing liquid lens, respectively;

FIGS. 4A to 4E are timing charts for explaining a method of detecting a delay time before transmitting a data signal Dt;

FIGS. 5A to 5E are timing charts for explaining a method of detecting the delay time while transmitting the data signal Dt;

FIGS. 15A and 15B are a plan view and a front view for explaining the operation of a diffusing unit having the diffusing plate shown in FIG. 13A;

FIGS. 18A and 18B are perspective views corresponding to FIGS. 17A and 17B, respectively;

FIG. 21 is a view of an example of the optical space transmission apparatus having the optical axis adjusting function; and FIG. 22 is a view of the schematic structure of the conventional optical transmission apparatus.

DESCRIPTION OF THE PREFERRED EMBODIMENTS

First Embodiment

Figure 1:
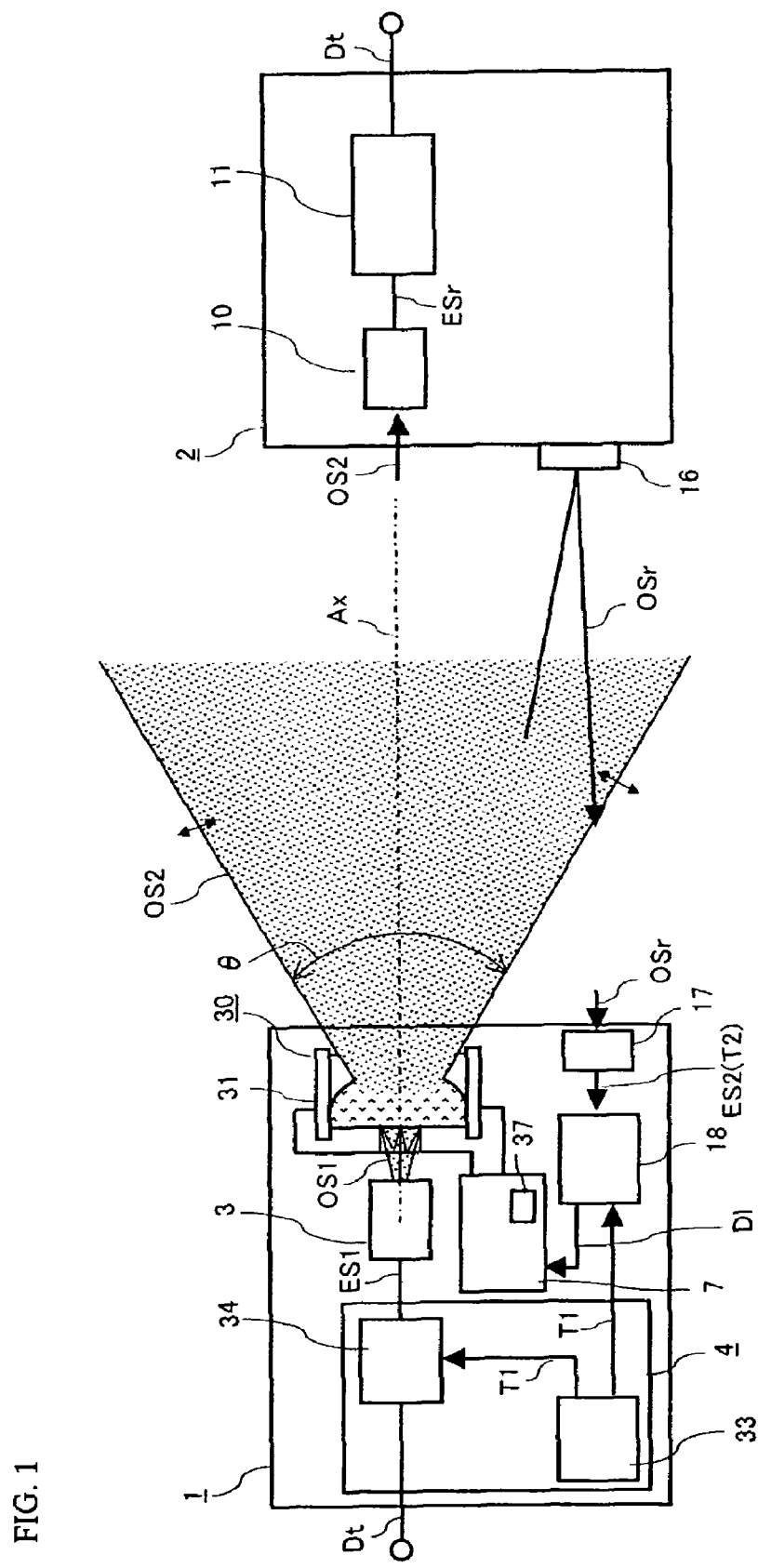
FIG. 1 is a block diagram of an optical transmission system according to a first embodiment of the present invention.

FIG. 1 is a block diagram of an optical transmission system according to a first embodiment of the present invention.

Referring to FIG. 1, the optical transmission system includes an optical transmitter 1 and an optical receiver 2 disposed so as to be opposed to each other in free space. The optical transmitter 1 transmits an optical signal through free space, and the optical receiver 2 receives the optical signal transmitted from the optical transmitter 1.

The optical transmitter 1 has a transmitting circuit 4, a light emitting device 3, a diffusing liquid lens 30, a driving unit 31, a reflected light receiving unit 17, and a delay time calculating unit 18.

The transmitting circuit 4 receives a data signal Dt, and generates a first electrical signal ES1 for driving the succeeding light emitting device 3 based on the received data signal Dt. More specifically, the transmitting circuit 4 according to the present embodiment includes a timing signal generating unit 33 and an adding unit 34. The timing signal generating unit 33 generates a predetermined first timing signal T1, and outputs the first timing signal T1 to the adding unit 34 and the delay time calculating unit 18. The adding unit 34 adds the data signal Dt and the first timing signal T1 together to thereby generate the first electrical signal ES1.

The light emitting device 3 electrical-to-optical converts the first electrical signal ES1 outputted from the adding unit 34 into a first optical signal OS1. The light emitting device 3 emits the first optical signal OS1 to the diffusing liquid lens 30.

The diffusing liquid lens 30 diffuses the first optical signal OS1 inside itself, and outputs a second optical signal OS2 having a spread angle θ. Details of the diffusing liquid lens 30 will be described later.

The reflected light receiving unit 17 receives a reflected optical signal OSr reflected by a reflecting unit 16 of the optical receiver 2, and converts the received optical signal OSr into a second electrical signal ES2. Then, the reflected light receiving unit 17 outputs the second electrical signal ES2 to the delay time calculating unit 18. The reflected optical signal OSr is part of the second optical signal OS2. Therefore, the second electrical signal ES2 contains the same components (the data signal and the first timing signal) as the first electrical signal ES1. Hereinafter, for the convenience of explanation, the timing signal contained in the second electrical signal ES1 will be referred to as "second timing signal" for the sake of distinction from the first timing signal.

The delay time calculating unit 18 calculates the delay time of the second timing signal T2 from the first timing signal T1 based on the first timing signal T1 outputted from the timing signal generating unit 33 and the second timing signal T2 contained in the second electrical signal ES2. Specifically, the delay time calculating unit 18 calculates, as the delay time, the difference between the detection time of the first timing signal T1 and the detection time of the second timing signal T2. The delay time calculating unit 18 generates a delay signal D1 representative of the calculated delay time, and outputs the delay signal D1 to a controlling unit 7.

The controlling unit 7 adjusts the control voltage applied to the diffusing liquid lens 30 based on the delay signal D1 outputted from the delay time calculating unit 18.

The optical receiver 2 has: a light receiving device 10 that photoelectrically converts the second optical signal OS2 outputted from the optical transmitter 1 into an electrical signal ESr; a receiving circuit 11 that performs processing such as amplification on the electrical signal ESr, and demodulates the data signal Dt; and the reflecting unit 16 disposed so as to face the optical transmitter 1. Part of the second optical signal OS2 is reflected by the reflecting unit 16 and is incident on the reflected light receiving unit 17 as the reflected optical signal OSr.

The optical transmitter 1 according to the present embodiment mainly has the following three features: 1) the diffusing liquid lens; 2) the detection of the delay time; and 3) the adjustment of the control voltage. Hereinafter, details of these features will be described in due order.

<1. Diffusing Liquid Lens>

Figure 2A:
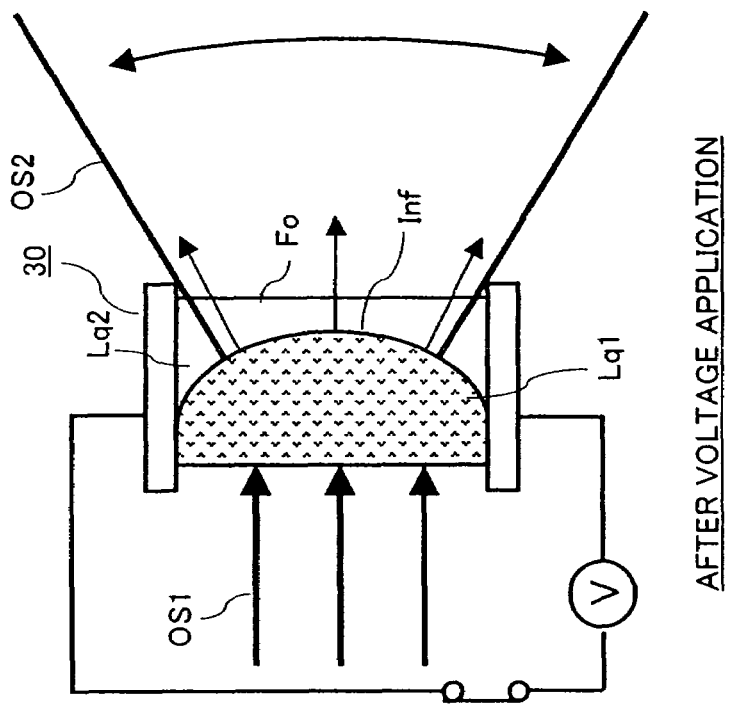
FIGS. 2A and 2B are schematic views of a diffusing liquid lens shown in FIG. 1.
Figure 2B:
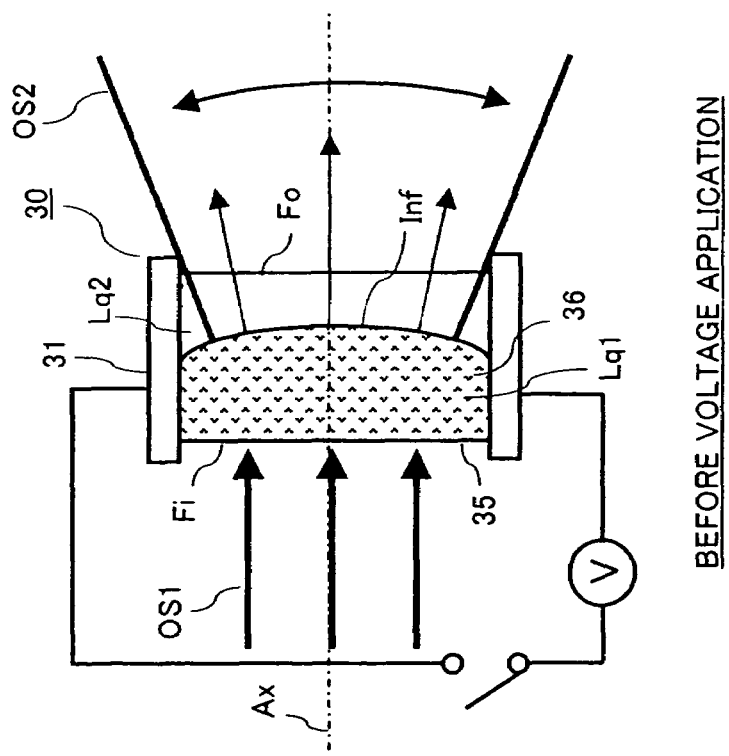

FIGS. 2A and 2B are schematic views of the diffusing liquid lens shown in FIG. 1.

Referring to FIG. 2A, the diffusing liquid lens 30 includes: a hollow chamber 35 having an incidence plane Fi and an exit plane Fo; and a driving unit 31 to which a control voltage is externally applied. A first liquid Lq1, a second liquid Lq2 and a scattering material 36 that scatters light are enclosed in the chamber 35. The kind of the scattering material 36 is not specifically limited, and various known minute particles and compounds are usable that have the property of diffusely reflecting light and a high affinity for the first liquid.

The first liquid Lq1 and the second liquid Lq2 form a convex boundary surface Inf in the propagation direction of the first optical signal OS1, and are separated in order in the propagation direction of the first optical signal OS1 along the optical axis Ax. As shown in FIG. 2B, the curvature of the boundary surface Inf between the first liquid Lq1 and the second liquid Lq2 changes according to the control voltage applied to the driving unit 31. The principle of the change of the curvature of the boundary surface Inf is not explained here because it is the same as the known one related to liquid lenses.

The incident light from the incidence plane Fi of the diffusing liquid lens 30 is scattered by the scattering material 36 in the first liquid Lq1, and exits from the entire area of the boundary surface Inf. At this time, since the exiting light travels mainly in the direction normal to the boundary surface Inf as shown by the thin arrows in FIGS. 2A and 2B, the second optical signal OS2 having a spread angle corresponding to the curvature of the boundary surface Inf passes through the second liquid Lq2 and exits from the exit plane Fo of the diffusing liquid lens 30.

As described above, the second optical signal OS2 exiting from the exit plane Fo of the diffusing liquid lens 30 has a substantially uniform radiant intensity distribution on a plane orthogonal to the optical axis Ax. Therefore, when the optical signal outputted from the light emitting device is emitted through the diffusing liquid lens 30, the light source viewed from the exit plane Fo of the diffusing liquid lens 30 is assumed to be the extended source. According to the IEC60825-1 standard, when a light emitting device, which is operable to emit light with a wavelength λ of 850 nm, outputs an optical signal through the diffusing liquid lens 30, the maximum optical output power satisfied the eye safety is 29.4 mW.

Therefore, by using the diffusing liquid lens 30 according to the present embodiment, the optical output power can be made significantly high while ensuring safety compared with when the zoom lens is used (the maximum optical power is 0.78 mW). With the increase in optical output power, the communication-possible distance between the optical transmitter 1 and the optical receiver 2 can be increased.

<2. Detection of the Delay Time>

To improve the use efficiency of the second optical signal OS2, it is desirable to minimize the spread angle of the second optical signal OS2 to thereby reduce the power loss of the output light. Here, the change amount of the reception possible range of the optical signal (that is, the propagation area of the optical signal) when the spread angle of the second optical signal OS2 is adjusted differs according to the distance between the optical transmitter 1 and the optical receiver 2. Therefore, to adjust the spread angle of the second optical signal OS2 so as to be minimized, it is necessary to consider the distance between the optical transmitter 1 and the optical receiver 2.

Therefore, prior to the explanation of details of the method of detecting the delay time of the second timing signal T2, it will be explained that the diffusing liquid lens according to the present embodiment is superior to the zoom lens in the estimation of the distance between the optical transmitter 1 and the optical receiver 2.

FIGS. 3A and 3B are schematic views of the radiant intensity distributions of the zoom lens and the diffusing liquid lens, respectively. In these figures, for the convenience of explanation, the positions where the light receiving surface of the optical receiver can be situated are shown by chain double-dashed lines.

Generally, the radiant intensity distribution of the light exiting from the zoom lens is expressed by the Gaussian distribution shown in FIG. 3A. On a plane P1 orthogonal to the optical axis, the radiant intensity of the zoom lens is extremely high when the distance from the optical axis is equal to or smaller than a given value, and rapidly decreases when the distance from the optical axis exceeds the given distance. That is, a large difference in radiant intensity occurs between the center and periphery of the propagation plane of the light onto the plane P1. The light receiving amount of the optical receiver markedly differs between when the center of the light receiving surface of the optical receiver coincides with the optical axis (position A) and when the center is shifted from the optical axis (position B). Therefore, unless the distance from the optical axis to the center of the light receiving surface is determined, it is difficult to determine, based on the light receiving amount of the optical receiver, the distance between the optical transmitter and the optical receiver.

On the other hand, the radiant intensity distribution of the light exiting from the diffusing liquid lens is, as shown in FIG. 3B, substantially uniform on the plane P1. Therefore, the difference in the light receiving amount of the optical receiver between when the center of the light receiving surface of the optical receiver coincides with the optical axis (position A) and when the center is shifted from the optical axis (position B) is small compared with when the zoom lens is used. Consequently, the distance between the optical transmitter and the optical receiver can be accurately estimated, based on the light receiving amount of the optical receiver, even when the optical axes of the optical transmitter and the optical receiver do not strictly coincide with each other.

Accordingly, in the present embodiment, as an example, the reflected optical signal OSr reflected by the optical receiver 2 is used to estimate the distance between the optical transmitter 1 and the optical receiver 2. The reason therefor is as follows.

The reflected optical signal OSr contains the same components (the data signal and the timing signal) as the second optical signal OS2. In addition, the delay time between the same components contained in these optical signals and the distance between the optical transmitter 1 and the optical receiver 2 are proportional to each other in theory. Therefore, by detecting the delay time of the second timing signal T2, the distance between the optical transmitter 1 and the optical receiver 2 necessary to adjust the curvature of the boundary surface of the diffusing liquid lens 30 can be estimated.

FIGS. 4A to 4E are timing charts for explaining the method of detecting the delay time before transmitting the data signal. The delay time detecting method is necessarily performed only once, for example, when the optical transmitter 1 is activated. In FIGS. 4A to 4E, the lateral axis represents time, and the longitudinal axis represents the signal amplitude.

The timing signal generating unit 33 outputs the first timing signal T1 before data signal Dt is inputted to the adding unit 34 (FIG. 4B). The adding unit 34 adds the first timing signal T1 outputted from the timing signal generating unit 33 to the data signal Dt to be transmitted (FIG. 4A) to thereby generate the first electrical signal ES1. As described already, the first electrical signal ES1 is transmitted to the optical receiver 2 as the second optical signal OS2 (FIG. 4C). The reflected optical signal OSr (FIG. 4D) reflected from the optical receiver 2 is converted into the second electrical signal ES2, which contains the same components as the first electrical signal ES1 and has a different amplitude from the first electrical signal ES1 (FIG. 4E).

The delay time calculating unit 18 detects the first timing signal T1 outputted from the timing signal generating unit 33 and the second timing signal T2 outputted from the reflected light receiving unit 17, and calculates, as the delay time T, the difference between the detection times of the rising edges of the two timing signals.

FIGS. 5A to 5E are timing charts for explaining the method of detecting the delay time while transmitting the data signal Dt. Also in FIGS. 5A to 5E, the lateral axis represents time, and the longitudinal axis represents the signal amplitude.

When the data signal Dt and the first timing signal T1 are added, to detect the delay time, the timing signal generating unit 33 has the following two features:

First, the timing signal generating unit 33 generates the first timing signal T1 so that the pulse width of the first timing signal T1 is smaller than that of the data signal Dt. This is done to distinguish the amplitude of the data signal Dt from that of the second timing signal T2.

Second, the timing signal generating unit 33 repetitively generates a combination of a plurality of pulse signals having different amplitudes. This is done to identify the object of the comparison between the first timing signal T1 and the second timing signal T2.

The delay time calculating unit 18 is capable of detecting the peak values of the first timing signal T1 and the second timing signal T2 and calculating the time difference between the two peak values as the delay time τ.

The structure using the reflected optical signal OSr from the optical receiver 2 to estimate the distance between the optical transmitter 1 and the optical receiver 2 like the present embodiment is advantageous in that it can be realized by the structure of the optical transmitter 1 without the incorporation of a special circuit part or the like in the optical receiver 2.

However, the method of feeding back the information necessary for the distance estimation from the optical receiver 2 to the optical transmitter 1 is not limited to the above method using the delay time. Variations of the distance estimation method will be described in an embodiment described later.

<3. Adjustment of the Control Voltage by the Controlling Unit>

The delay time calculating unit 18 generates the delay signal D1 representative of the calculated delay time, and outputs the delay signal D1 to the controlling unit 7. Hereinafter, the method of the controlling unit 7 adjusting the control voltage applied to the diffusing liquid lens 30 based on the delay signal will be described.

Figures 6, 7:
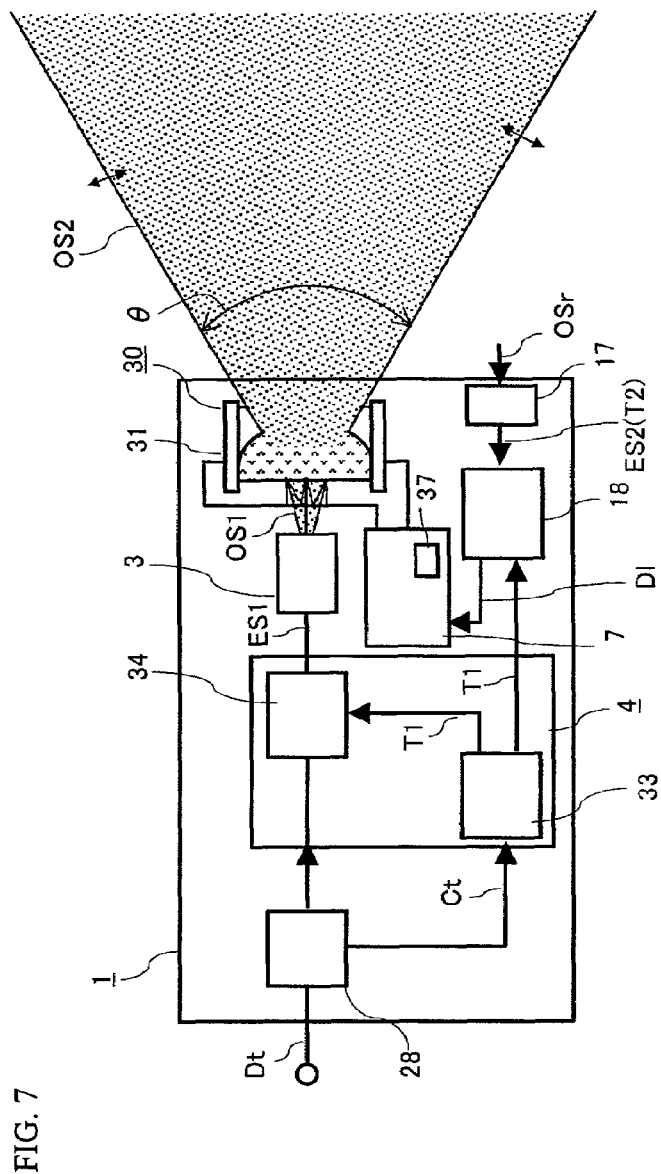
FIG. 6 is a view of the control information held by a memory shown in FIG. 1.
FIG. 7 is a block diagram of the structure of an optical transmitter according to a second embodiment of the present invention.

FIG. 6 is a view of the control information held by a memory 37 shown in FIG. 1.

The control information includes: values $\tau 1$ to $\tau 3$ of the delay time represented by the delay signal D1; and control voltages V1 to V3 predefined for the values $\tau 1$ to $\tau 3$ of the delay time, respectively. Further, FIG. 6 depicts, for ease of explanation, radii of curvature r1 to r3 of the boundary surface of the diffusing liquid lens when the control voltages V1 to V3 are applied.

The controlling unit 7 adjusts the control voltage applied to the driving unit 31 of the diffusing liquid lens 30 based on the delay signal D1 outputted from the delay time calculating unit 18 and the control information stored in the memory 37. Since the curvature of the boundary surface of the diffusing liquid lens 30 changes according to the applied control voltage, the spread angle of the second optical signal OS2 changes.

As described above, in the optical transmitter 1 according to the present embodiment, the first optical signal OS1 outputted from the light emitting device 3 is diffused by the diffusing liquid lens 30, and the second optical signal OS2 having a spread angle corresponding to the curvature of the boundary surface of the diffusing liquid lens 30 is outputted. Since the second optical signal OS2 can be regarded as an extended source exiting from the entire area of the boundary surface of the diffusing liquid lens 30, the output optical power of the light emitting device 3 can be increased. Consequently, the distance for which the optical transmitter 1 can transmit the optical signal can be increased.

Moreover, since the radiant intensity distribution of the light outputted from the diffusing liquid lens 30 does not significantly change depending on the distance from the optical axis, it is unnecessary to strictly adjust the optical axes of the optical transmitter 1 and the optical receiver 2, so that user convenience increases.

Further, the curvature of the boundary surface of the diffusing liquid lens 30 is adjusted, based on the time difference between the first timing signal T1 generated by the timing signal generating unit and the second timing signal T2 detected from the reflected optical signal Osr, so that the propagation area of the second optical signal OS2 is minimized. Consequently, the power of the optical signal incident on the optical receiver 2 can be adaptively optimized based on the actual use environment (for example, the placement position and the placement distance) of the optical transmitter 1 and the optical receiver 2.

Second Embodiment

FIG. 7 is a block diagram of the structure of an optical transmitter according to a second embodiment of the present invention.

The optical transmitter 1 according to the present embodiment has a transmission rate changing unit 28 in addition to the structure of the optical transmitter according to the first embodiment. The transmission rate changing unit 28 receives the data signal Dt to be transmitted, and changes the transmission rate of the data signal Dt. The transmission rate changing unit 28 outputs, to the timing signal generating unit 33, a timing change signal Ct that provides instructions to change the timing signal generation interval in response to a change of the transmission rate of the data signal Dt.

Figure 8A:
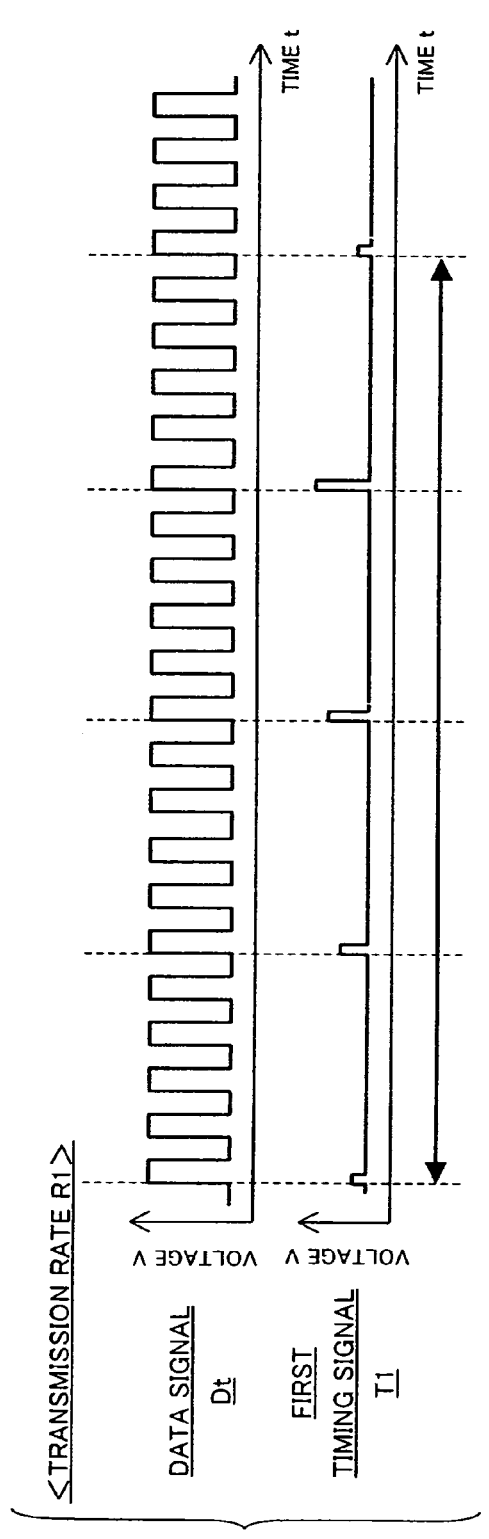
FIGS. 8A and 8B are timing charts of the data signal and the timing signal supplied to an adding unit shown in FIG. 7.
Figure 8B:
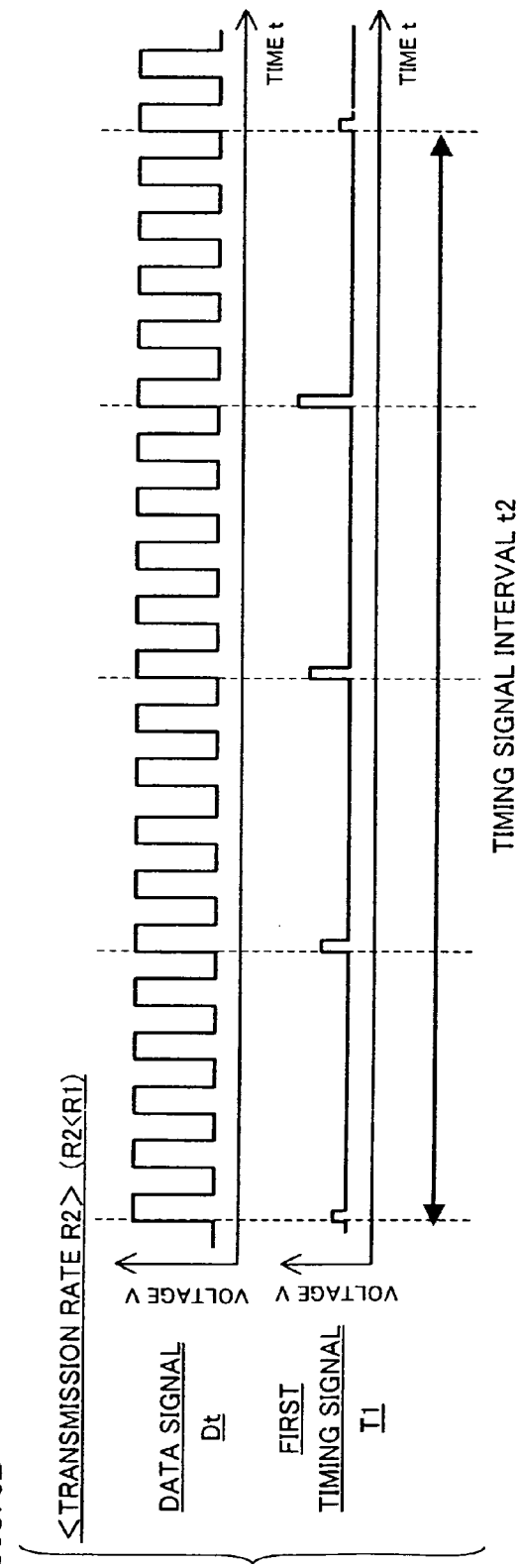

FIGS. 8A and 8B are timing charts of the data signal and the timing signal supplied to the adding unit shown in FIG. 7.

Referring to FIG. 8A, when the transmission rate changing unit 28 outputs the data signal Dt at a transmission rate R1, the timing signal generating unit 33 generates the timing signal so that the interval between pulses having the same amplitude is t1.

Referring next to FIG. 8B, when the transmission rate changing unit 28 changes the transmission rate from R1 to R2 (R2<R1), a timing change signal Ct is outputted to the timing signal generating unit 33. The timing signal generating unit 33 changes the interval between pulses having the same amplitude from t1 to t2 (t2>t1) based on the timing change signal Ct.

In the optical transmitter 1 according to the present embodiment, since the timing signal generation interval can be changed, the range of the delay time detectable by the delay time calculating unit 18 can be increased or decreased according to the distance between the optical transmitter 1 and the optical receiver 2.

Third Embodiment

Figure 9:
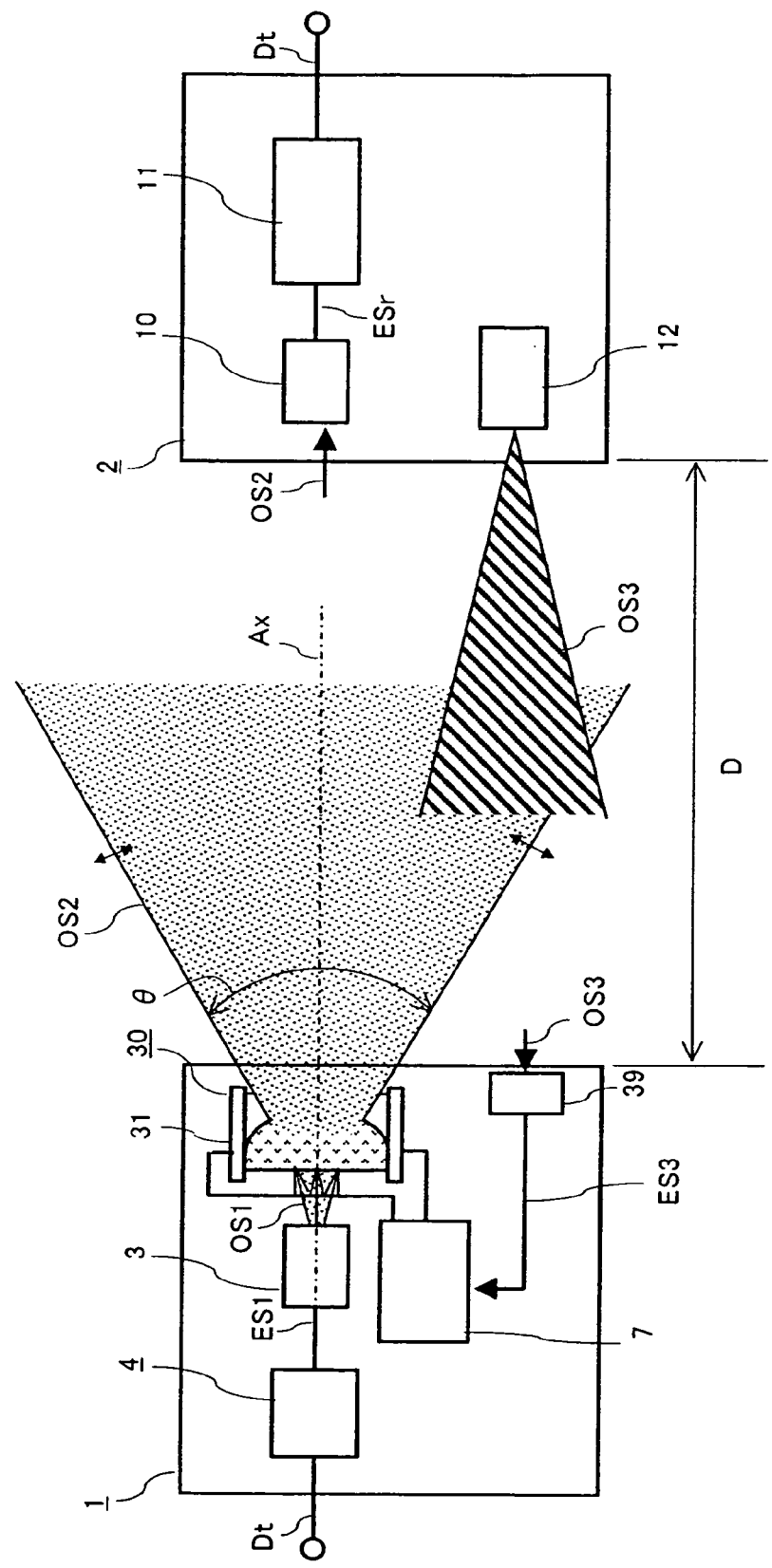
FIG. 9 is a block diagram of the structure of an optical transmission system according to a third embodiment of the present invention.

FIG. 9 is a block diagram of the structure of an optical transmission system according to a third embodiment of the present invention. Since the basic structure of the optical transmission system according to the present embodiment is similar to that according to the first embodiment, hereinafter, the difference between the present embodiment and the first embodiment will be mainly described.

The optical transmitter 1 according to the present embodiment has a light receiving device 39 instead of the reflected light receiving unit 17 and the delay time calculating unit 18 shown in the first embodiment (FIG. 1). The optical receiver 2 has a light emitting unit 12 instead of the reflecting unit 16 shown in the first embodiment (FIG. 1). The wavelength of the light outputted by the light emitting unit 12 is different from that of the light outputted by the light emitting device 3 of the optical transmitter 1.

When the optical transmitter 1 and the optical receiver 2 start communication (for example, when the optical transmitter 1 and the optical receiver 2 are activated), the light emitting unit 12 of the optical receiver 2 outputs an optical signal OS3. On the other hand, in the optical transmitter 1, the light receiving device 39 generates an electrical signal ES3 corresponding to the power of the optical signal OS3, and outputs the electrical signal ES3 to the controlling unit 7.

The controlling unit 7 adjusts the control voltage applied to the diffusing liquid lens 30 based on the electrical signal ES3 outputted from the light receiving device 39. More specifically, the relation among the distance between the optical transmitter 1 and the optical receiver 2, the light receiving power of the optical signal OS3 (the level of the electrical signal ES3) and the optimum spread angle of the second optical signal OS2 can be previously obtained by measurement. Therefore, the controlling unit 7 applies the control voltage predefined for each level of the electrical signal ES3 to the diffusing liquid lens. As a consequence, the curvature of the boundary surface of the diffusing liquid lens 30 is changed, and the optimum spread angle of the second optical signal OS2 is set.

For example, when the distance between the optical transmitter 1 and the optical receiver 2 is larger than the distance D shown in FIG. 9, since the power of the optical signal OS3 incident on the light receiving device 39 in the optical transmitter 1 is decreased, the level of the electrical signal ES3 is decreased. The controlling unit 7 reduces the voltage applied to the diffusing liquid lens 30 according to the level of the electrical signal ES3. As a consequence, the radius of curvature of the boundary surface of the diffusing liquid lens 30 is increased, so that the spread angle of the second optical signal OS2 can be decreased.

Conversely, when the distance between the optical transmitter 1 and the optical receiver 2 is smaller than the distance D shown in FIG. 9, since the power of the optical signal OS3 incident on the light receiving device 39 in the optical transmitter 1 is increased, the level of the electrical signal ES3 is increased. The controlling unit 7 increases the voltage applied to the diffusing liquid lens 30 according to the level of the electrical signal ES3. As a consequence, the radius of curvature of the boundary surface of the diffusing liquid lens 30 is decreased, so that the spread angle of the second optical signal OS2 can be increased.

As described above, in the optical transmission system according to the present embodiment, the spread angle of the second optical signal OS2 can be optimized with a simple structure.

Fourth Embodiment

Figure 10:
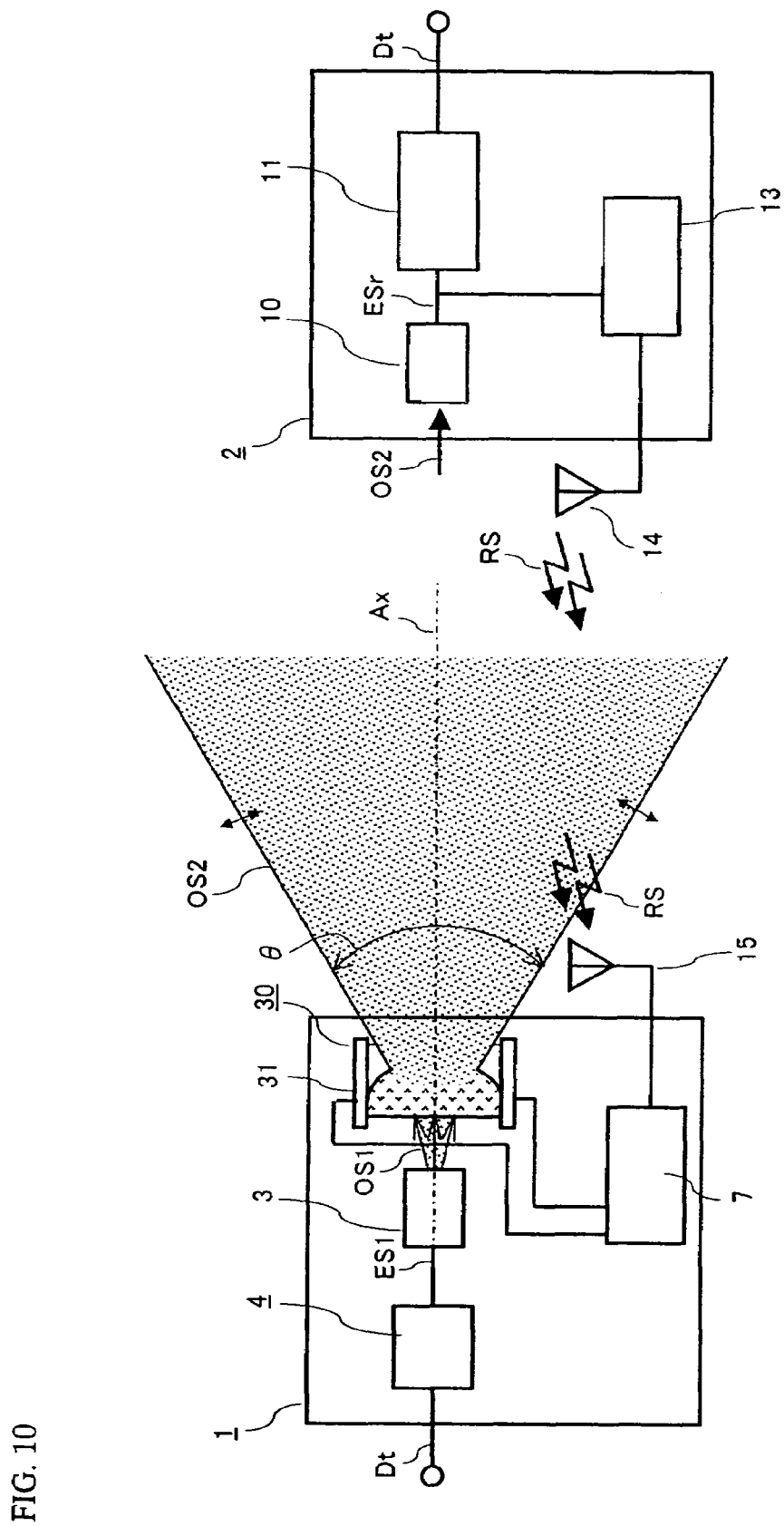
FIG. 10 is a block diagram of the structure of an optical transmission system according to a fourth embodiment of the present invention.

FIG. 10 is a block diagram of the structure of an optical transmission system according to a fourth embodiment of the present invention. Since the basic structure of the optical transmission system according to the present embodiment is similar to that according to the first embodiment, hereinafter, the difference between the present embodiment and the first embodiment will be mainly described.

The optical transmitter 1 according to the present embodiment has a light receiving power receiving unit 15 instead of the reflected light receiving unit 17 and the delay time calculating unit 18 shown in the first embodiment (FIG. 1). The optical receiver 2 has a light receiving power detecting unit 13 and a light receiving power transmitting unit 14 instead of the reflecting unit 16 shown in the first embodiment (FIG. 1).

First, in the optical receiver 2, the light receiving device 10 converts the second optical signal OS2 outputted from the optical transmitter 1 into the electrical signal ESr, and outputs the electrical signal ESr to the receiving circuit 11 and the light receiving power detecting unit 13. The light receiving power detecting unit 13 detects the level of the electrical signal ESr. The light receiving power transmitting unit 14 outputs a radio signal RS representative of the level of the electrical signal ESr based on the level detected by the light receiving power detecting unit 13.

Then, in the optical transmitter 1, the light receiving power receiving unit 15 receives the radio signal RS, and outputs, to the controlling unit 7, an electrical signal representative of the level of the electrical signal ESr represented by the radio signal RS, that is, an signal representative of the light receiving power of the second optical signal OS2. The controlling unit 7 adjusts, based on the electrical signal outputted from the light receiving power receiving unit 15, the control voltage applied to the diffusing liquid lens 30 so that the light receiving power of the second optical signal OS2 is as high as possible.

As described above, in the optical transmission system according to the present embodiment, the spread angle of the second optical signal OS2 can be optimized with a simple structure.

The light receiving power transmitting unit 14 and the light receiving power receiving unit 15 may perform wire communication or optical communication instead of performing radio communication.

Fifth Embodiment

Figure 11:
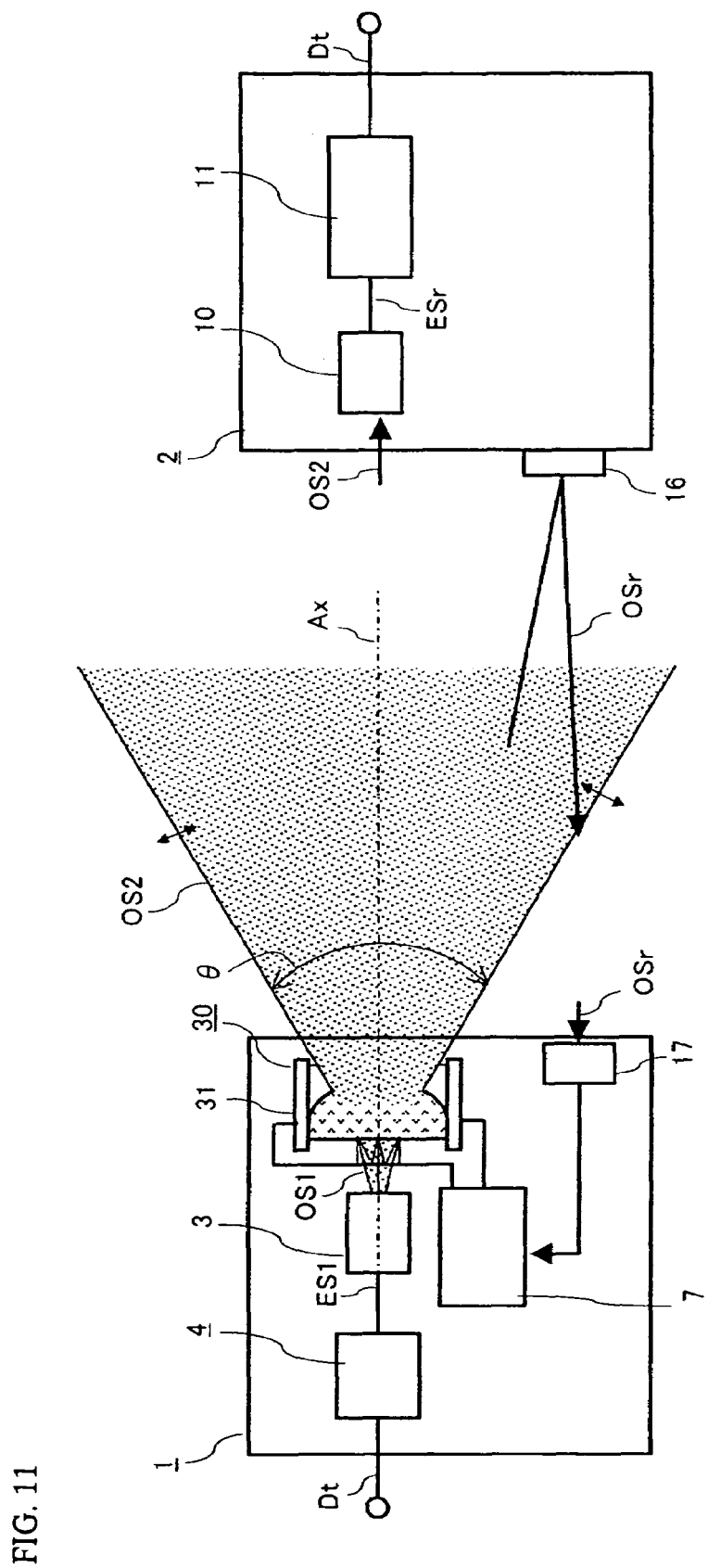
FIG. 11 is a block diagram of the structure of an optical transmission system according to a fifth embodiment of the present invention.

FIG. 11 is a block diagram of the structure of an optical transmission system according to a fifth embodiment of the present invention. The optical transmission system according to the present embodiment is the optical transmission system shown in the first embodiment (FIG. 1) from which the delay time calculating unit 18 and the timing signal generating unit 33, included in the optical transmitter 1, are removed.

The optical transmitter 1 according to the present embodiment adjusts the curvature of the boundary surface of the diffusing liquid lens 30 based on the reflected light OSr reflected from the optical receiver 2 like the first embodiment. However, in the present embodiment, the diffusing liquid lens 30 is controlled simply by the power of the reflected light OSr.

The relation between the power of the reflected light OSr outputted from the optical receiver 2 and the distance between the optical transmitter 1 and the optical receiver 2 is previously obtained by measurement. That is, the power of the reflected light OSr detected by the reflected light receiving unit 17 decreases as the distance between the optical transmitter 1 and the optical receiver 2 increases. Therefore, the controlling unit 7 applies the control voltage predefined for each level of the electrical signal outputted from the reflected light receiving unit 17 to the diffusing liquid lens 30.

As described above, in the optical transmission system according to the present embodiment, the spread angle of the second optical signal OS2 can be optimized with a simple structure.

Sixth Embodiment

Figure 12:
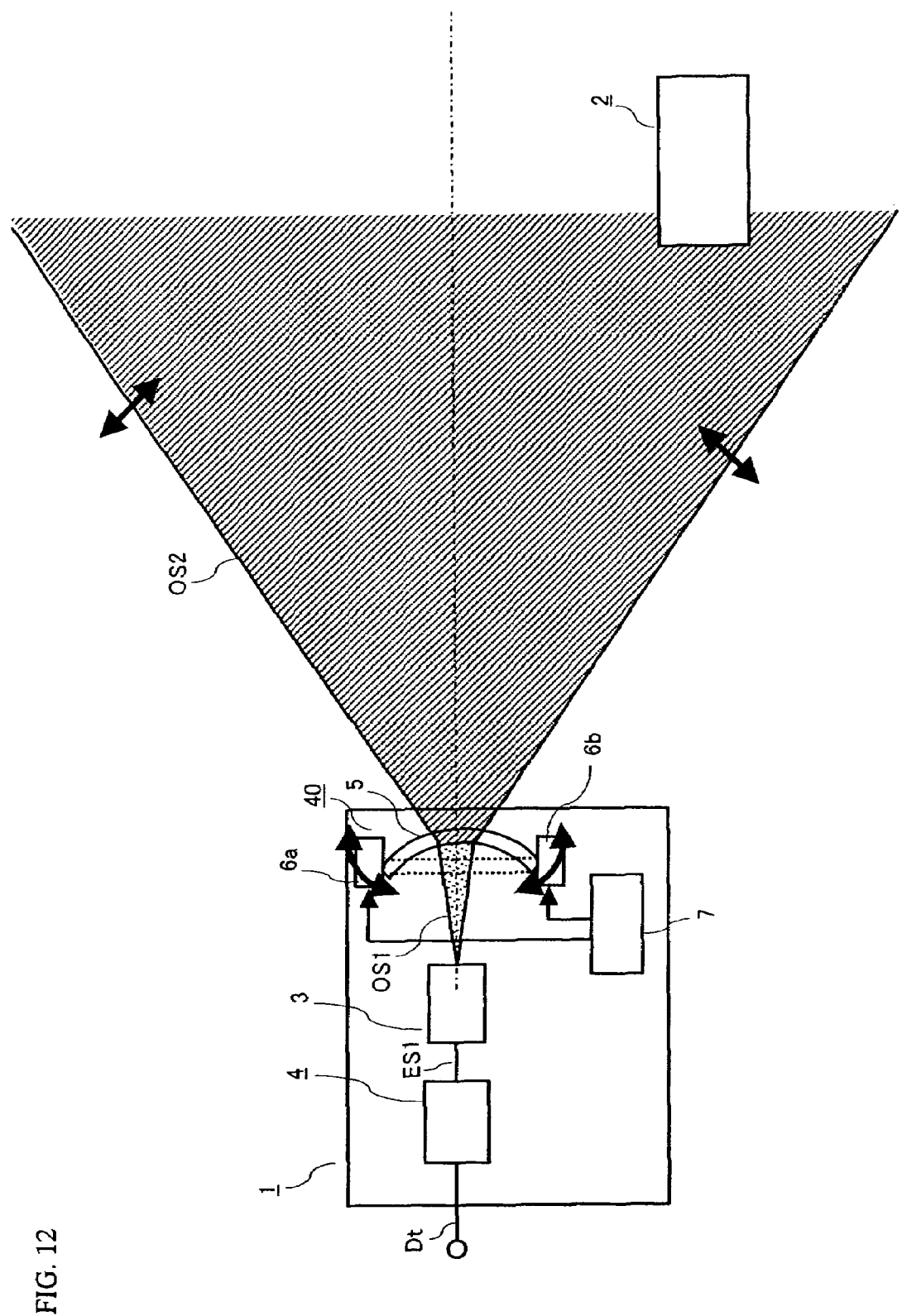
FIG. 12 is a block diagram of the structure of an optical transmission system according to a sixth embodiment of the present invention.

FIG. 12 is a block diagram of the structure of an optical transmission system according to a sixth embodiment of the present invention.

The optical transmission system according to the present embodiment includes: the optical transmitter 1 having the transmitting circuit 4, the light emitting device 3, a diffusing unit 40 and the controlling unit 7; and the optical receiver 2 the same as that according to the first embodiment. Hereinafter, the diffusing unit 40, which is characteristic of the optical transmitter 1 according to the present embodiment, will be mainly described.

The diffusing unit 40 is made of a sheet-form material having flexibility. The diffusing unit 40 has a diffusing plate 5 where a material that scatters light is mixed and at least one pair of piezoelectric devices 6a and 6b that press a part of the perimeter of the diffusing plate 5 and another part opposed to the part.

The diffusing plate 5 scatters the light emitted from the light emitting device 3, and makes it radiate from the entire surface thereof. The piezoelectric devices 6a and 6b press the diffusing plate 5 in a direction in which they approach each other according to the control voltage applied from the controlling unit 7. The diffusing plate 5 forms a curved surface convex in the direction of travel of the first optical signal OS1 according to the pressing by the piezoelectric devices 6a and 6b. Therefore, the diffusing unit 40 can output the second optical signal OS2 having a spread angle corresponding to the curvature of the diffusing plate 5 like the diffusing liquid lens 30 according to the first embodiment.

Figure 13C:
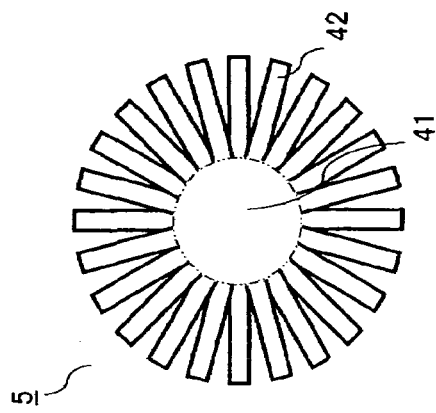
FIGS. 13A to 13C are plan views of concrete examples of a diffusing plate.
Figure 13B:
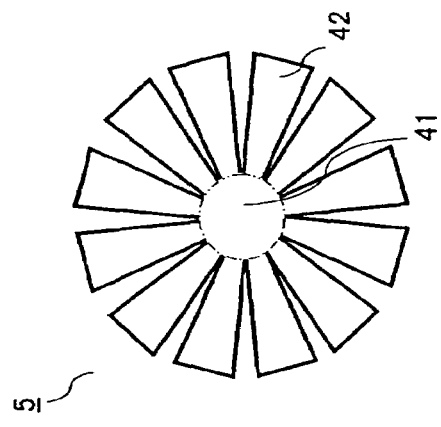
Figure 13A:
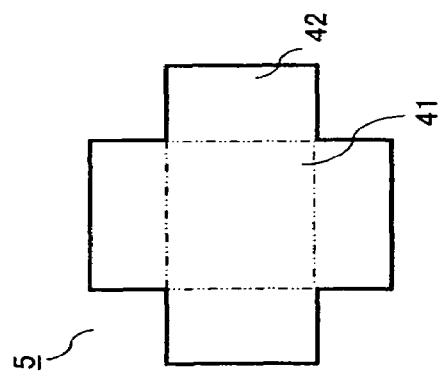

FIGS. 13A to 13C are plan views of concrete examples of the diffusing plate.

The diffusing plate 5 is formed by cutting out parts of a square or circular sheet-form material. More specifically, the diffusing plate 5 has a square or circular first sheet portion 41 and a plurality of second sheet portions 42 integrally connected to the perimeter of the first sheet portion 41 and radially extending from the center of the first sheet portion 41.

The configuration of the diffusing plate 5 is not limited to the examples of FIGS. 13A to 13C, and it is necessary only that the configuration be such that a predetermined curved surface can be formed. However, it is advantageous that the diffusing plate 5 has a symmetrical configuration like the examples shown in FIGS. 13A to 13C, because the spread of the second optical signal OS2 can be made symmetrical.

As the material of the diffusing plate 5, a mixture may be used of a transparent resin material (for example, a styrene specialty resin) and a fine granular transparent material (for example, quartz glass) different in refractive index from the resin material.

Figure 14:
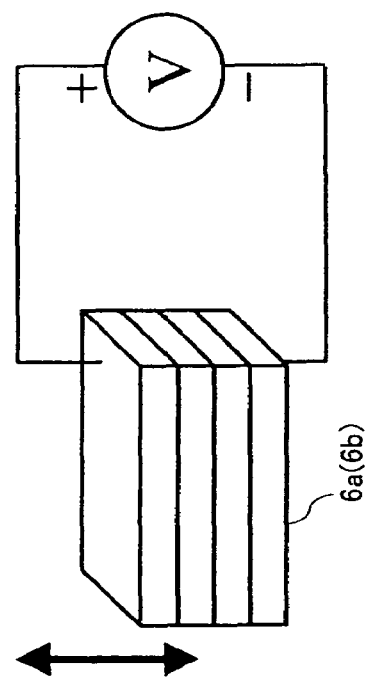
FIG. 14 is a schematic view of piezoelectric devices shown in FIG. 12.

FIG. 14 is a schematic view of the piezoelectric devices 6a and 6b shown in FIG. 12.

The piezoelectric devices 6a and 6b move the perimeter of the diffusing plate 5 by a movement amount corresponding to the control voltage applied from the controlling unit 7. In the present embodiment, the devices 6a and 6b are realized by the laminated piezoelectric devices. The laminated piezoelectric devices 6a and 6b are formed by laminating a plurality of piezoelectric devices, and has the property of expanding and contracting in the direction of lamination of the piezoelectric devices according to the applied voltage as shown by the arrow in FIG. 14.

Now, the concrete operation of the diffusing unit 40 will be described.

Figure 16B:
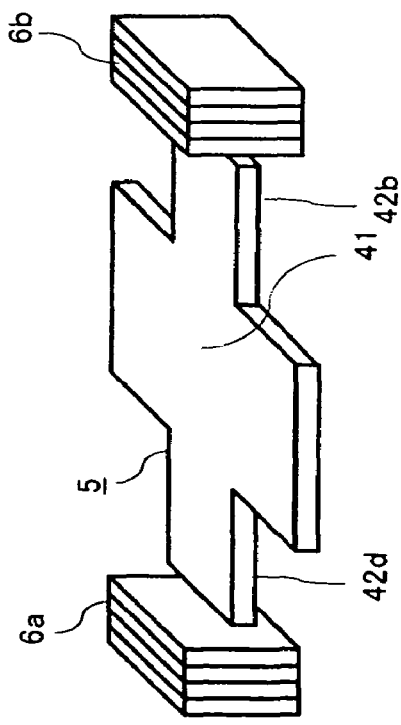
FIGS. 16A and 16B are perspective views corresponding to FIGS. 15A and 15B, respectively.
Figure 16A:
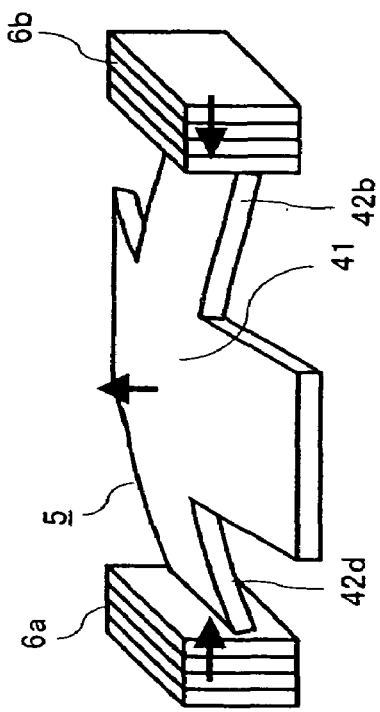

FIGS. 15A and 15B are a plan view and a front view for explaining the operation of the diffusing unit having the diffusing plate shown in FIG. 13A. FIGS. 16A and 16B are perspective views corresponding to FIGS. 15A and 15B, respectively. In FIGS. 16A and 16B, fixing units 8a and 8b are omitted.

As shown in FIG. 15A, the second sheet portions 42a and 42c of the diffusing plate 5 are fixed to the fixing units 8a and 8b so as not to move. The pair of piezoelectric devices 6a and 6b are disposed so as to be opposed to each other along parts of the second sheet portions 42b and 42d.

Before the control voltage is applied to the piezoelectric devices 6a and 6b, the diffusing plate 5 is flat (FIGS. 15A and 16A). When the control voltage is applied to each of the piezoelectric devices 6a and 6b, the piezoelectric devices 6a and 6b expand so as to approach each other, thereby pressing the second sheet portions 42b and 42d. In accordance with the pressing by the piezoelectric devices 6a and 6b, the diffusing plate 5 curves so that the first sheet portion 41 protrudes (FIGS. 15B and 16B). As a consequence, a curved surface is formed that has a curvature corresponding to the magnitude of the voltage applied to the piezoelectric devices 6a and 6b.

While the second sheet portions 42a and 42c are fixed to the fixing units 8 in the example, piezoelectric devices that press the second sheet portions 42a and 42c, respectively, may be further provided.

Figure 17A:
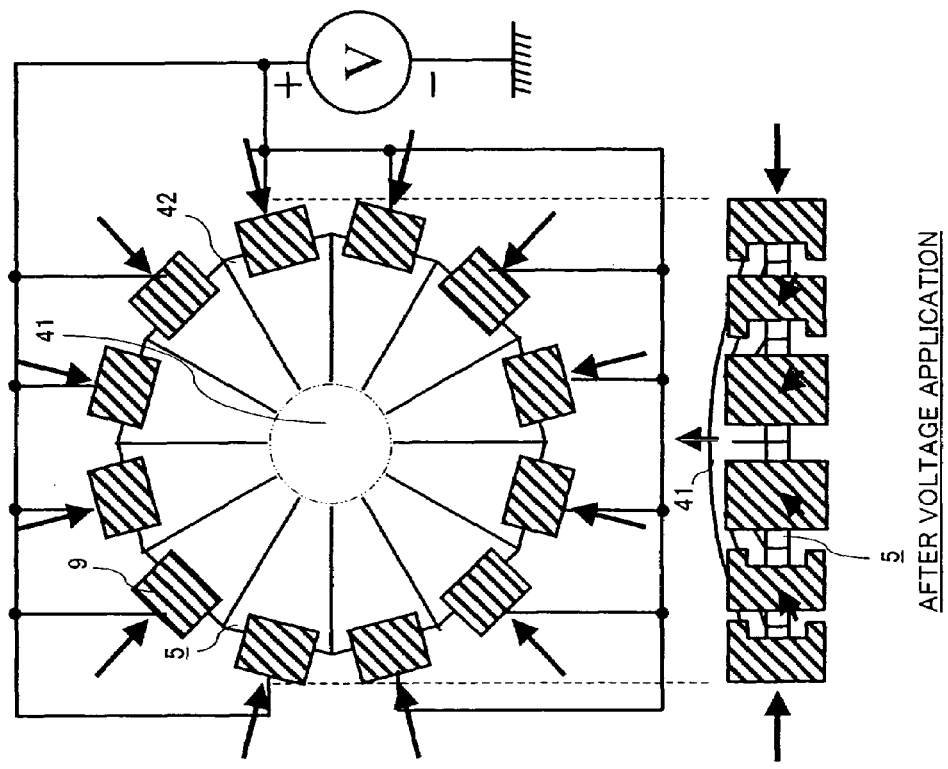
FIGS. 17A and 17B are a plan view and a front view for explaining the operation of a diffusing unit having the diffusing plate shown in FIG. 13B.
Figure 17B:
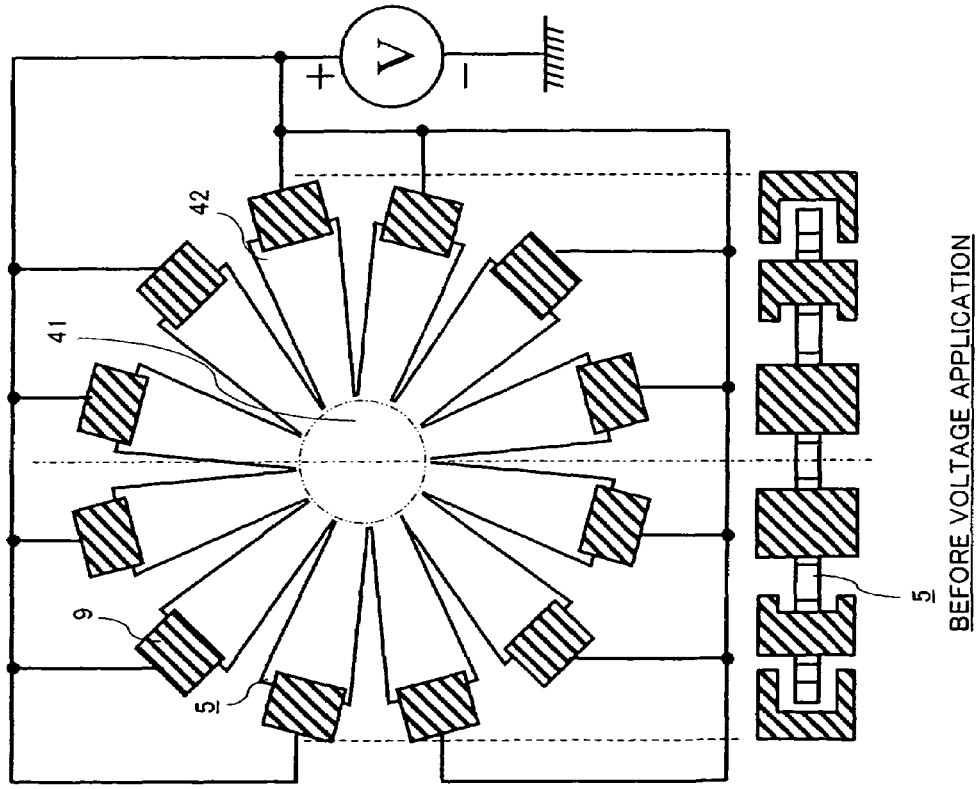

FIGS. 17A and 17B are a plan view and a front view for explaining the operation of the diffusing unit having the diffusing plate shown in FIG. 13B. FIGS. 18A and 18B are perspective views corresponding to FIGS. 17A and 17B, respectively. In FIGS. 18A and 18B, actuators 9 are omitted.

Referring to FIG. 17A, the second sheet portions 42 of the diffusing plate 5 may be controlled by the actuators 9 that drive the expansion and contraction according to the applied control voltage.

Before the voltage is applied to the actuators 9, the diffusing plate 5 is flat (FIGS. 17A and 18B). When the control voltage is applied to each of the actuators 9, the piezoelectric devices 6 expand so as to approach each other, thereby pressing the second sheet portions 42 toward the center of the first sheet portion 41. In accordance with the pressing by the actuators 9, the first sheet portion 41 is protruded so that the diffusing plate 5 is deformed into a domical shape (FIGS. 17B and 18B). As a consequence, a curved surface is formed that has a curvature corresponding to the magnitude of the voltage applied to the actuators 9.

As described above, the optical transmitter 1 according to the present embodiment has the diffusing unit 40 that diffuses the first optical signal OS1 emitted from the light emitting device 3 and forms the curved surface having a curvature corresponding to the voltage applied from the controlling unit 7. Consequently, the optical transmitter 1 according to the present embodiment produces similar effects to those produced by the optical transmitter 1 according to the first embodiment.

While in the present embodiment, the piezoelectric devices 6a and 6b or the actuators 9 are used as the driving devices that change the curvature of the diffusing plate 5, other devices may be used that are capable of controlling the curvature of the diffusing plate 5 by an electrical signal.

Seventh Embodiment

Figure 19:
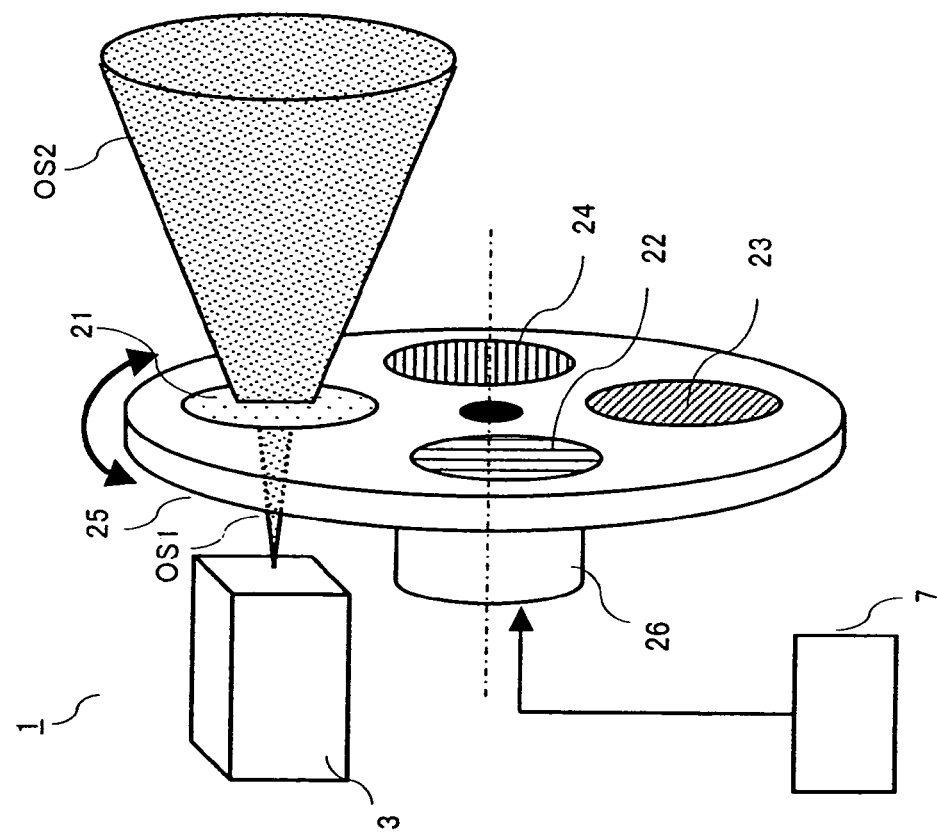
FIG. 19 is a schematic view of part of an optical transmitter according to a seventh embodiment of the present invention.
Figure 20A:
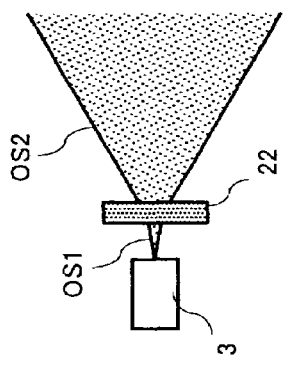
FIGS. 20A to 20D are views for explaining the relation between the four diffusing plates shown in FIG. 19 and the light spread angle.
Figure 20B:
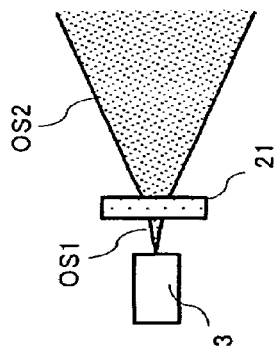
Figure 20C:
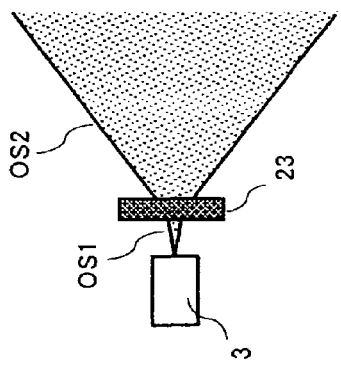
Figure 20D:
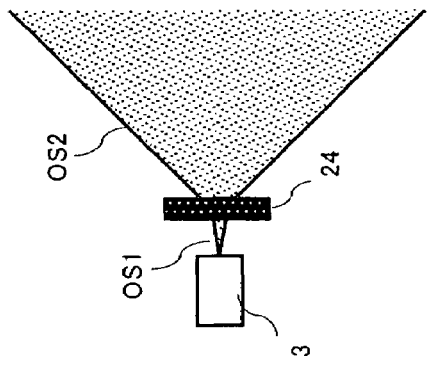

FIG. 19 is a schematic view of part of an optical transmitter according to a seventh embodiment of the present invention.

Referring to FIG. 19, the optical transmitter 1 has: the light emitting device 3; four diffusing plates 21 to 24 containing a scattering material that scatters light; a rotating plate 25 that holds the diffusing plates 21 to 24 so as to be flush with one another; a rotation driving unit 26 that rotates the rotating plate 25 about the central axis thereof; and the controlling unit 7. The amount of scattering material mixed in the diffusing plates 21 to 24 is larger in the order of the diffusing plates 21 to 24.

FIGS. 20A to 20D are views for explaining the relation between the four diffusing plates shown in FIG. 19 and the light spread angle.

The diffusing plates 21 to 24, which each have a diffusing material, diffuse the light emitted from the light emitting device 3. Since the degree of the light diffusion is higher in the order of the diffusing plates 21 to 24 according to the amount of diffusing material being mixed, the spread angle of the output light changes as shown in FIGS. 20A to 20D.

Referring again to FIG. 19, in the optical transmitter 1 according to the present embodiment, the rotating plate 25 is rotated so that one of the diffusing plates 21 to 24 is opposed to the exit plane of the light emitting device 3 based on the control signal outputted from the controlling unit 7. Consequently, in the optical transmitter 1 according to the present embodiment, the spread angle of the optical signal can be changed by switching among a plurality of diffusing plates.

While four diffusing plates 21 to 24 are attached in the present embodiment, the number of diffusing plates may be three or less, or five or more.

While the optical transmitter 1 has one light emitting device in the embodiments, it may have a plurality of light emitting devices.

The present invention is useful, for example, for optical transmission systems that transmit optical signals through free space.

While the invention has been described in detail, the foregoing description is in all aspects illustrative and not restrictive. It is understood that numerous other modifications and variations can be devised without departing from the scope of the invention.

What is claimed is:

1. An optical transmitter system comprising:
   an optical receiver; and
   an optical transmitter which transmits an optical signal to the optical receiver through free space,
   the optical transmitter comprising:
   an electrical-to-optical converting unit for converting a first electrical signal to be transmitted into an optical signal, and emitting the optical signal;
   a diffusing liquid lens including a first liquid and a second liquid, the first and second liquids being separated in order in a propagation direction along an optical axis of the electrical-to-optical converting unit and forming a convex boundary surface having a curvature, the convex boundary surface being formed in the propagation direction of the optical signal, and a scattering material being mixed in the first liquid to scatter light, the curvature of the boundary surface being changed based on a control voltage being applied to the diffusing liquid lens;
   a controlling unit for adjusting the control voltage applied to the diffusing liquid lens,
   a transmitting unit for receiving a data signal, and generating the first electrical signal based on the data signal;
   a reflected light receiving unit for receiving a reflected optical signal, the reflected optical signal being part of the optical signal reflected from the optical receiver, and converting the reflected optical signal into a second electrical signal; and
   a delay time calculating unit for calculating a delay time of the second electrical signal from the first electrical signal, and outputting a delay signal representative of the delay time to the controlling unit,
   wherein the controlling unit adjusts the control voltage based on the delay signal,
   wherein the transmitting unit includes:
      a timing signal generating unit for outputting a predetermined timing signal; and
      an adding unit for adding the data signal and the predetermined timing signal together to thereby generate the first electrical signal, and
      the delay time calculating unit calculates the delay time based on a difference between detection times of the predetermined timing signal outputted from the timing signal generating unit and a timing signal contained in the second electrical signal, and
   wherein the timing signal generating unit repetitively outputs a series of timing signals that are different in amplitude level from each other and are smaller in pulse width than the data signal.

2. The optical transmitter system according to claim 1, wherein the delay time calculating unit detects a peak value of the predetermined timing signal outputted from the timing signal generating unit and a peak value of the timing signal contained in the second electrical signal, and calculates the delay time based on the detected peak values.

3. The optical transmitter system according to claim 1, wherein
   the optical transmitter further comprises:
      a memory for storing control information where the control voltage is predetermined for every delay time represented by the delay signal,
      wherein the controlling unit adjusts the control voltage based on the delay signal and the control information.

4. The optical transmitter system according to claim 1, wherein the controlling unit adjusts the control voltage so that the curvature of the boundary surface is maximum in an initial state before the data signal is inputted to the transmitting unit.

5. The optical transmitter system according to claim 1, wherein
   the delay time calculating unit predetermines a maximum value and a minimum value of the delay time, and
   when the delay time is the maximum value, the controlling unit controls the control voltage so that the curvature of the boundary surface is minimum, and when the delay time is the minimum value, the controlling unit controls the control voltage so that the curvature of the boundary surface is maximum.

6. An optical transmitter system comprising:
   an optical receiver; and
   an optical transmitter which transmits an optical signal to the optical receiver through free space,
   the optical transmitter comprising:
   an electrical-to-optical converting unit for converting a first electrical signal to be transmitted into an optical signal, and emitting the optical signal;
   a diffusing liquid lens including a first liquid and a second liquid, the first and second liquids being separated in order in a propagation direction along an optical axis of the electrical-to-optical converting unit and forming a convex boundary surface having a curvature, the convex boundary surface being formed in the propagation direction of the optical signal, and a scattering material being mixed in the first liquid to scatter light, the curvature of the boundary surface being changed based on a control voltage being applied to the diffusing liquid lens;
   a controlling unit for adjusting the control voltage applied to the diffusing liquid lens,
   a transmitting unit for receiving a data signal, and generating the first electrical signal based on the data signal;
   a reflected light receiving unit for receiving a reflected optical signal, the reflected optical signal being part of the optical signal reflected from the optical receiver, and converting the reflected optical signal into a second electrical signal; and
   a delay time calculating unit for calculating a delay time of the second electrical signal from the first electrical signal, and outputting a delay signal representative of the delay time to the controlling unit,
   wherein the controlling unit adjusts the control voltage based on the delay signal,
   wherein the transmitting unit includes:
      a timing signal generating unit for outputting a predetermined timing signal; and
      an adding unit for adding the data signal and the predetermined timing signal together to thereby generate the first electrical signal, and
      the delay time calculating unit calculates the delay time based on a difference between detection times of the predetermined timing signal outputted from the timing signal generating unit and a timing signal contained in the second electrical signal, and wherein the optical transmitter further comprises a transmission rate changing unit for changing transmission rates of the data signal and the timing signal.

7. The optical transmitter system according to claim 6, wherein the delay time calculating unit detects a peak value of the predetermined timing signal outputted from the timing signal generating unit and a peak value of the timing signal contained in the second electrical signal, and calculates the delay time based on the detected peak values.

8. The optical transmitter system according to claim 6, wherein the optical transmitter further comprises:
a memory for storing control information where the control voltage is predetermined for every delay time represented by the delay signal, wherein the controlling unit adjusts the control voltage based on the delay signal and the control information.

9. The optical transmitter system according to claim 6, wherein the controlling unit adjusts the control voltage so that the curvature of the boundary surface is maximum in an initial state before the data signal is inputted to the transmitting unit.

10. The optical transmitter system according to claim 6, wherein the delay time calculating unit predetermines a maximum value and a minimum value of the delay time, and when the delay time is the maximum value, the controlling unit controls the control voltage so that the curvature of the boundary surface is minimum, and when the delay time is the minimum value, the controlling unit controls the control voltage so that the curvature of the boundary surface is maximum.

* * * * *